United States Patent
Sano et al.

(10) Patent No.: US 7,413,713 B2
(45) Date of Patent: Aug. 19, 2008

(54) REACTION APPARATUS AND MIXING SYSTEM

(75) Inventors: Tadashi Sano, Chiyoda (JP); Ryo Miyake, Tsukuba (JP); Akira Koide, Azuma (JP); Norihide Saho, Tsuchiura (JP); Akiomi Kono, Tomobe (JP); Takeshi Harada, Abiko (JP)

(73) Assignee: Hitachi, Ltd., Tokyo (JP)

(*) Notice: Subject to any disclaimer, the term of this patent is extended or adjusted under 35 U.S.C. 154(b) by 685 days.

(21) Appl. No.: 10/283,215

(22) Filed: Oct. 30, 2002

(65) Prior Publication Data
US 2003/0086842 A1 May 8, 2003

(30) Foreign Application Priority Data

Oct. 30, 2001 (JP) ............................. 2001-332416
May 7, 2002 (JP) ............................. 2002-131236

(51) Int. Cl.
*B01J 10/00* (2006.01)
*B01J 10/02* (2006.01)
*B01J 12/00* (2006.01)
*B01J 12/02* (2006.01)
*B01J 14/00* (2006.01)

(52) U.S. Cl. ...................... 422/129; 422/139; 422/140; 436/43; 436/52; 436/53; 436/174; 436/180; 436/181

(58) Field of Classification Search ............... 422/129, 422/139, 140; 436/43, 52, 53, 174, 180, 436/181
See application file for complete search history.

(56) References Cited

U.S. PATENT DOCUMENTS

| | | | |
|---|---|---|---|
| 5,993,750 A | 11/1999 | Ghosh et al. | |
| 6,790,417 B2* | 9/2004 | Boger | 422/222 |
| 6,932,951 B1* | 8/2005 | Losey et al. | 422/211 |
| 2002/0197194 A1* | 12/2002 | Machado et al. | 422/190 |
| 2003/0068261 A1* | 4/2003 | Taheri et al. | 422/197 |

FOREIGN PATENT DOCUMENTS

| | | |
|---|---|---|
| JP | 11-5029 | 1/1999 |
| WO | WO 99/22858 | 5/1999 |

* cited by examiner

*Primary Examiner*—Brian Sines
(74) *Attorney, Agent, or Firm*—Antonelli, Terry, Stout & Kraus, LLP.

(57) ABSTRACT

A reaction apparatus comprises a first supply flow channel having a fine flow channel cross sectional area for a liquid pressurized by a pressurizing device, a gas supply flow channel having a fine flow channel cross sectional area for supplying a gas, a two-phase flow channel having a fine flow channel cross sectional area in communication with a joined portion for the first supply flow channel and the second supply flow channel for flowing a gas/liquid two-phase fluid, a gas bubble reaction flow channel in communication with the exit of the gas/liquid two-phase channel and having a flow channel cross sectional area larger than that of the gas/liquid two-phase flow channel, and a liquid discharge flow channel for discharging the liquid in the gas bubble reaction flow channel. Therefore, in the reaction apparatus, a stable mixing ratio of a gas to a liquid can be obtained and the mixing speed of the gas to the liquid is increased.

17 Claims, 14 Drawing Sheets

REACTION APPARATUS AND MIXING SYSTEM

BACKGROUND OF THE INVENTION

1. Field of the Invention

The present invention relates to a reaction apparatus and, more in particular, it relates to a reaction apparatus and a mixing system having fine flow channels.

2. Related Art

For providing a gas/liquid mixing and dissolving apparatus capable of improving the dissolution ratio of a gas to a liquid, shortening the time for dissolution and reducing the size, Japanese Patent Laid-Open No. 2001-129377, for example, provides a gas/liquid mixing and dissolving apparatus comprising a substantially cylindrical dissolution tank having a flow inlet formed about at an upper central portion and a discharge port formed in a lower portion, and a jetting device for jetting a gas/liquid mixture comprising a liquid and a gas mixed with each other from the flow inlet downwardly, generating turbulent vortexes of bubbles inside the dissolution tank to make bubbles formed in the dissolution tank finer, forming a state where fine bubbles are generated substantially for the entire liquid stagnating inside the dissolution tank and dissolving the gas into the liquid. The device for jetting the gas/liquid mixture comprises a pump for pressurizing the liquid and jetting the same from the flow inlet of the dissolution tank to form a gas/liquid mixture by stirring and mixing a gas pressurized by the compressor to a liquid pressurized by the pump and jet the gas/liquid mixture from the flow inlet of the dissolution tank.

SUMMARY OF THE INVENTION

However, in the existent gas/liquid mixing and dissolving apparatus described above, since the gas/liquid mixture is formed by stirring and mixing the gas pressurized by the compressor to the liquid pressurized by the pump, the gas/liquid mixture is jetted into the dissolution tank to generate the turbulent vortexes of bubbles, inside the dissolution tank and make the bubbles formed inside the dissolution tank finer, bubbles of not uniform size are formed. This results in a problem that no stable gas/liquid mixing ratio can be obtained in the gas/liquid mixing and dissolving apparatus and the gas/liquid mixing is slow.

This invention intends to provide a reaction apparatus capable of obtaining a stable gas/liquid mixing ratio and increasing the reaction rate.

This invention further intends to provide a mixing system capable of easily replacing a mixing apparatus in a case where troubles occur in the mixing apparatus or for obtaining necessary products, and capable of obtaining a stable mixing ratio and increasing the mixing speed.

A reaction apparatus according to this invention, for attaining the foregoing object, comprises a first supply flow channel having a fine flow channel cross sectional area for supplying liquid to be reacted, a second supply flow channel having a fine flow channel cross sectional area for supplying object to be reacted, a two-phase flow channel having a fine flow channel cross sectional area in communication with a joined portion for the first supply flow channel and the second supply flow channel for flowing the liquid from the first supply flow channel and the object from the second supply flow channel as a two-phase fluid, a reaction flow channel in communication with the exit of the two-phase flow channel and having a flow channel cross sectional area larger than that of the two-phase flow channel, and a liquid discharge flow channel for discharging the liquid in the reaction flow channel after reaction.

Further, a reaction apparatus according to this invention, for attaining the foregoing object, comprises a first supply flow channel having a fine flow channel cross sectional area for supplying a liquid pressurized by a pressurizing device, a second supply flow channel having a fine flow channel cross sectional area for supplying a gas, a two-phase flow channel in communication with a joined portion for the first supply flow channel and the second supply flow channel and having a fine flow channel cross sectional area for flowing a gas/liquid two-phase fluid, a reaction flow channel in communication with the exit of the two-phase flow channel and having a flow channel cross sectional area larger than that of the two-phase flow channel, a liquid discharge flow channel for discharging the liquid of the reaction flow channel, and a gas discharge flow channel for discharging the gas separated from the reaction flow channel.

A mixing system according to this invention, for attaining another object, comprises a mixing apparatus for mixing plural kinds of fluids, and a holder for detachably mounting the mixing apparatus in which the holder has a communication channel for communicating the mixing apparatus and the fluid supply portion or a fluid discharge portion, the mixing apparatus comprises a first supply flow channel having a fine flow channel cross sectional area for supplying liquid to be mixed, a second supply flow channel having a fine flow channel cross sectional area for supplying the other of fluids to be mixed, a two-phase flow channel in communication with a joined portion for the first supply flow channel and the second supply flow channel for flowing the liquid from the first supply flow channel and the liquid from the second supply flow channel as the two-phase fluid, a mixing flow channel in communication with the exit of the two-phase flow channel and having a flow channel cross sectional area larger than that of the two-phase flow channel, and a liquid discharge flow channel for discharging the liquid of the mixing flow channel.

DESCRIPTION OF THE ACCOMPANYING DRAWINGS

PREFERRED EMBODIMENTS OF THE INVENTION

Figure 1:
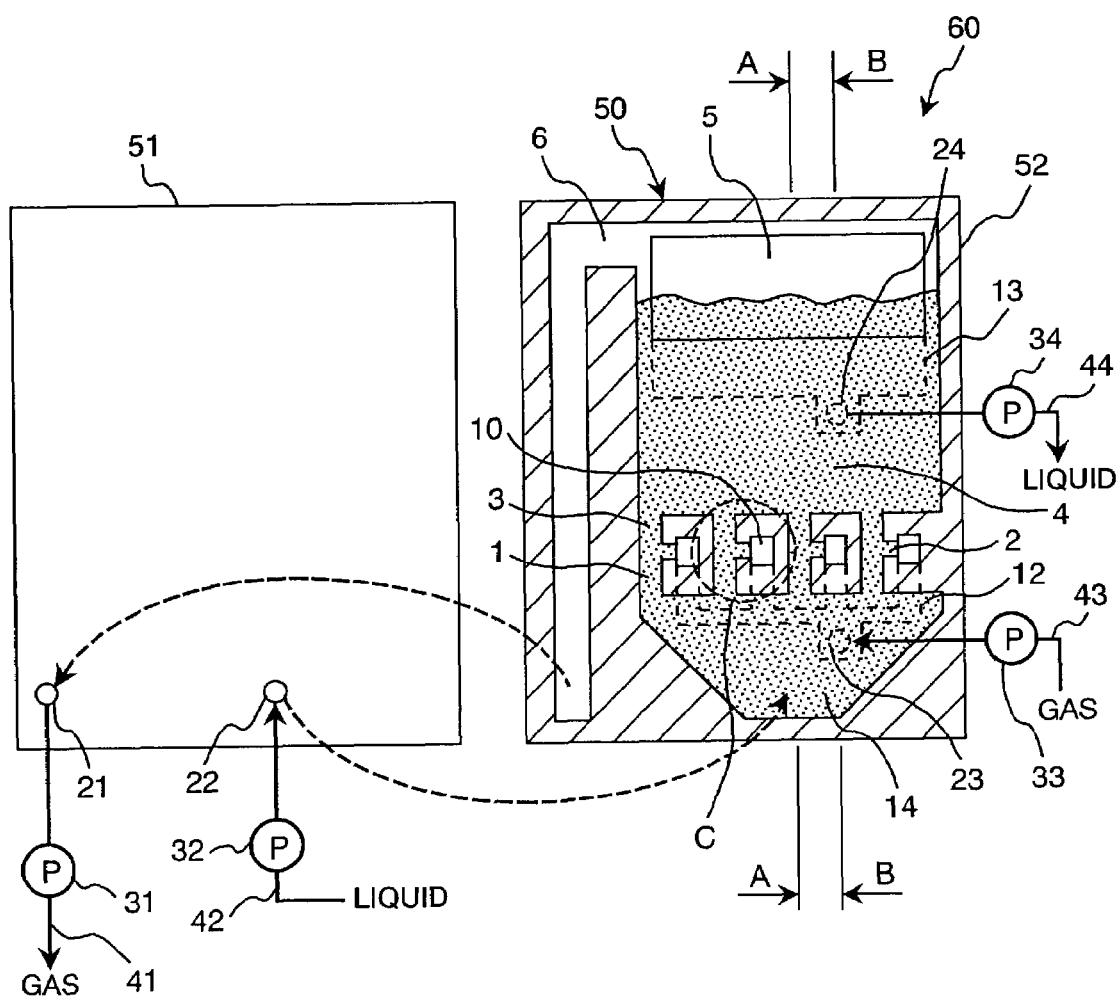
FIG. 1 is a constitutional exploded view showing a reaction apparatus of a first embodiment according.
Figure 2:
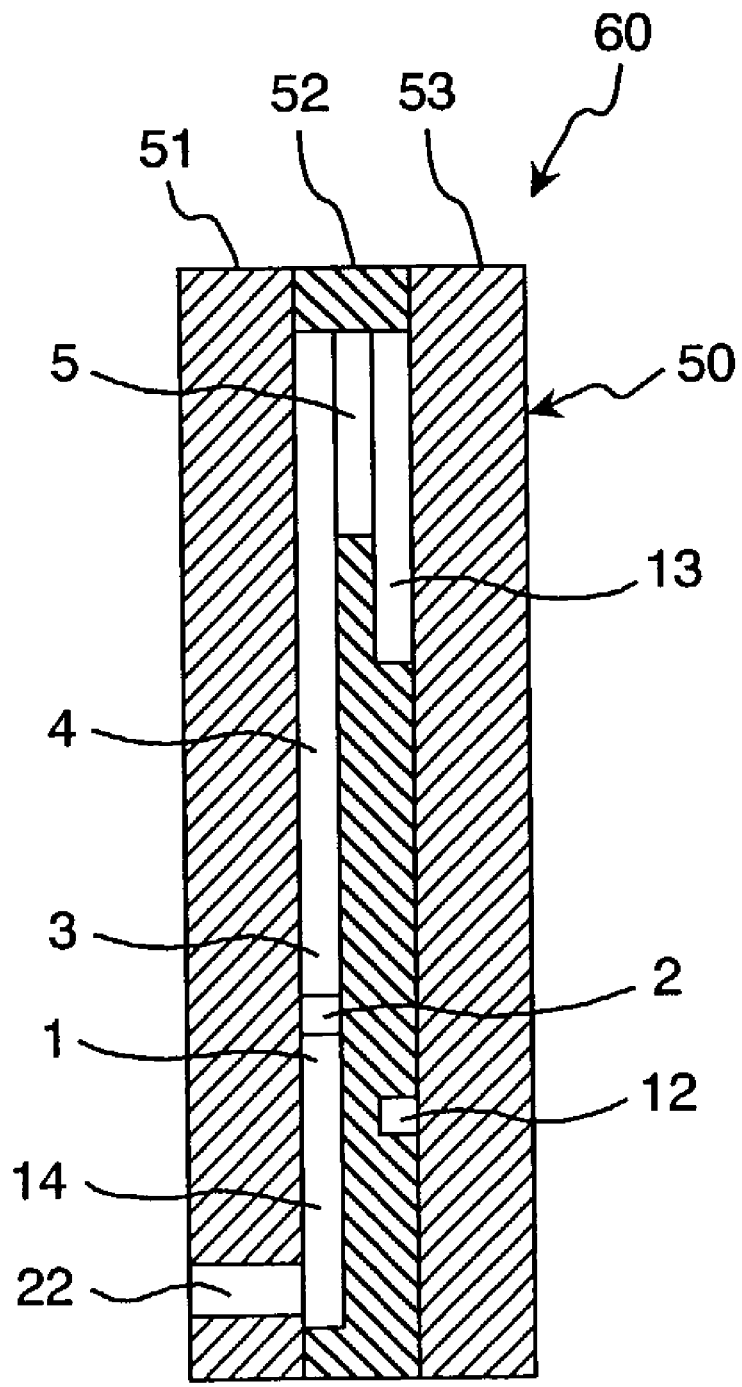
FIG. 2 is a cross sectional view of a reaction apparatus main body taken along line A-A in FIG. 1.
Figure 3:
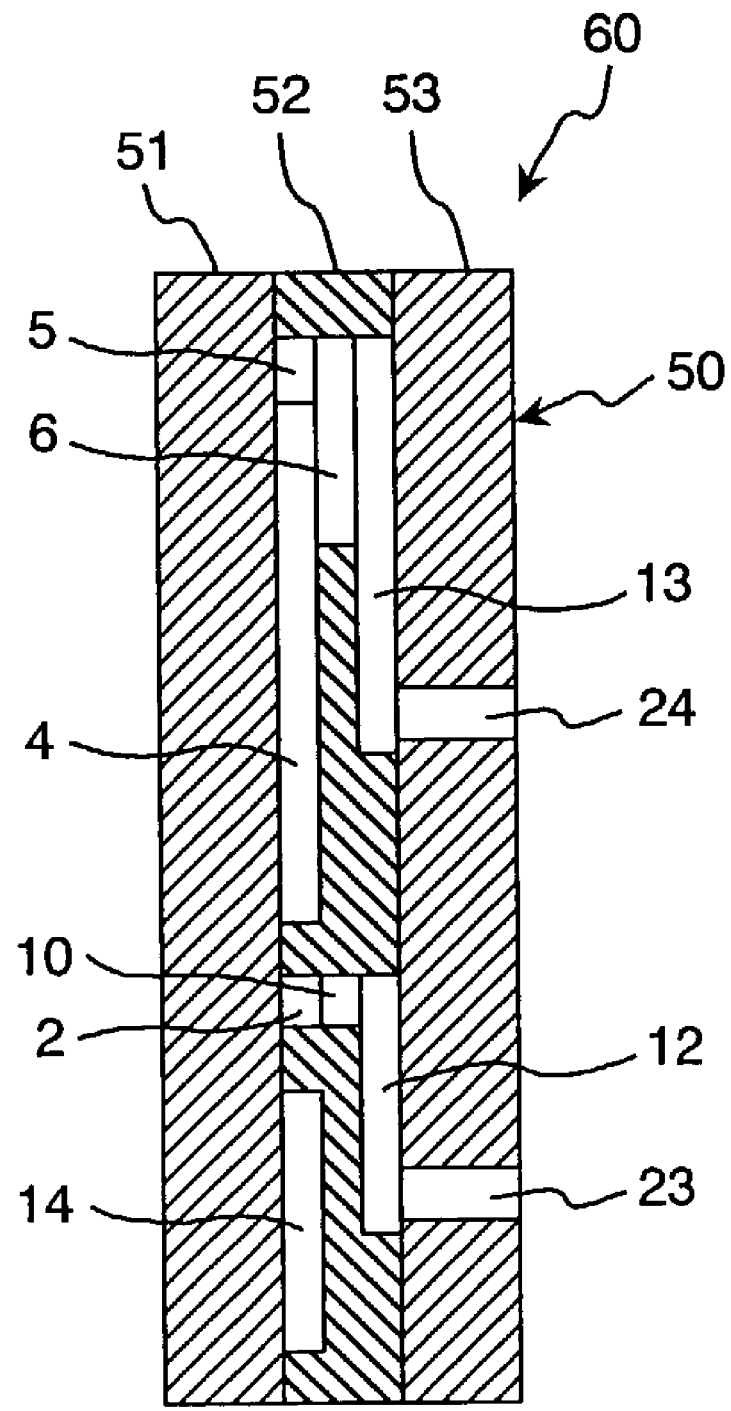
FIG. 3 is a cross sectional view of the reaction apparatus main body taken along line B-B in FIG. 1.

Preferred embodiments of this invention are to be described with reference to the drawings. In the drawings for each of embodiments, identical reference numerals indicate identical or corresponding portions.

A reaction apparatus of a first embodiment according to this invention is to be described with reference to FIG. 1 to FIG. 4.

At first, a constitution of the reaction apparatus of this embodiment is to be explained.

A reaction apparatus 60 comprises an apparatus main body 50, pumps 31 to 34 and pipelines 41 to 44. The apparatus main body 50 constitutes a main portion of the reaction apparatus 60. The pumps 31 to 34 are disposed for supplying or discharging a liquid or a gas to and from the apparatus main body 60. A control device (not illustrated) controls, for example, the on-off operations and the number of rotation of the pumps 31 to 34. The pipelines 41 to 44 are constituted so as to connect the outside of the apparatus with each of the communication ports of the apparatus main body 50 by way of the pumps 31 to 34.

The pump 32 and the pipeline 42 are disposed as a pressurization device for supplying a liquid under pressure from the outside of the apparatus to the apparatus main body 50. The pump 33 and the pipeline 43 are disposed as a pressurization device for supplying a gas under pressure from the outside of the apparatus to the apparatus main body 50. The pump 31 and the pipeline 41 are disposed as a device for discharging a gas from the apparatus main body 50 to the outside of the apparatus. The pump 34 and the pipeline 44 are disposed as a device for discharging a liquid from the apparatus main body 50 to the outside of the apparatus.

The apparatus main body 50 is formed of a multi-layered structure by stacking and joining plural substrates. Specifically, the apparatus main body 50 is a three-layered structure comprising a glass substrate 51, a silicon substrate 52 and a glass substrate 53. Flow channels, communication ports and the like of the silicon substrate 52 and the glass substrate 53 are formed each into a predetermined shape by using a micro-machining technique. The apparatus main body is constituted with a microcapsule of a this cuboidal body with an outer profiled size of about 15 mm width×20 mm height and 1.5 mm depth.

A gas discharge port 21 and a liquid injection port 22 are perforated in a lower portion of the glass substrate 51. The gas discharge port 21 is in communication at one end with the gas suction pump 31 and at the other end with a gas discharge flow channel 6. The liquid injection port 22 is in communication at one end to the liquid pressurizing pump 32 and at the other end with a liquid introduction flow channel 14. The pump 32 is adapted to increase a pressure to a predetermined level or control flow rate to a predetermined rate by a control device.

In the silicon substrate 52, flow channels are formed from both front and back sides by using the micro-machining technique. On one side (front side) of the silicon substrate 52, are arranged a liquid introduction flow channel 14, a liquid supply flow channel 1, a gas supply flow channel 2, a gas/liquid two-phase flow channels 3, and a bubble reaction flow channel 4 from lower to upper portions, and a gas discharge flow channel 6 is formed on the side thereof. On the other side (back side) of the silicon substrate 52, are formed a liquid discharge flow channel 13 and a gas introduction flow channel 12 independently in upper and lower portions. The liquid discharge flow channel 13 is in communication by way of the liquid communication flow channel 5 with the bubble reaction flow channel 4. The gas introduction flow channel 12 is in communication by way of a gas communication flow channel 10 with the gas supply flow channel 2. As described above, the liquid communication flow channel 5 and the gas communication flow channel 10 function as holes for communicating front and back flow channels.

The liquid introduction flow channel 14 is in communication at the lower portion with the liquid injection port 22 and in communication at the upper portion with the lower portion of the liquid supply flow channel 1. The liquid supply channel 1 is disposed by plurality and in communication with the liquid introduction flow channel 14. The gas supply flow channel 2 is in communication with the upper portion of each liquid supply flow channel 1. The gas/liquid two-phase flow channel 3 extends upwardly from the gas/liquid joined portion as the communication portion between the liquid supply flow channel 1 and the gas supply flow channel 2 and is in communication with the lower portion of the bubble reaction flow channel 4. Accordingly, the two-phase flow generating portion comprising the liquid supply flow channel 1, the gas supply flow channel 2 and the gas/liquid two-phase flow channel 3 are disposed in parallel by plurality between the liquid introduction flow channel 14 and the bubble reaction flow channel 4. The bubble reaction flow channel 4 is formed longitudinally. The upper portion of the bubble reaction flow channel 4 is in communication with the liquid communication flow channel 5 and the gas discharge flow channel 6. The lower end of the liquid communication flow channel 5 is situated below the lower end of the gas discharge flow channel 6, and the vertical size of the liquid communication flow channel 5 is made larger than the vertical size of the gas discharge flow channel 6. The gas discharge flow channel 6 extends from upper to lower portions of the silicon substrate 52.

Each of the liquid supply flow channel 1, the gas flow channel 2 and the gas/liquid two-phase flow channel 3 is formed of a minute flow channel with the flow channel cross sectional area of $1 \times 10^{-7}$ m$^2$ or less. The lower limit value for the flow channel cross sectional area is a value that the flow channel can be manufactured. In this embodiment, the liquid supply flow channel 1 and the gas/liquid two-phase flow channel 3 are of an identical flow channel cross sectional area, and the gas supply flow channel 2 is of a smaller flow channel cross sectional area. While the cross sectional shape for each of the liquid supply flow channel 1, the gas supply flow channel 2 and the gas/liquid two-phase flow channel 3 is made rectangular, it may be a trapezoid, or parallelogram or ellipse. An angle formed between the gas/liquid two-phase flow channel 3 and the liquid supply flow channel 1 or an angle formed between the gas/liquid two-phase flow channel 3 and the gas flow channel 1 may be optional so long as the angle can satisfy the operation to be described later.

Further, the shape of the gas supply flow channel 2 opened to the liquid supply flow channel 1 is made longer in the flowing direction of liquid than in the direction crossing therewith. While the shape of the opening is made rectangular which is easy to manufacture, it may be, for example, the trapezoide, parallelogram and ellipse if there is no requirement for considering the ease of manufacture.

The liquid discharge flow channel 13 extends downwardly from the liquid communication flow channel 5 to be in communication and as far as the central portion of the glass substrate 53. The central portion of the liquid discharge flow channel 13 is in communication with a liquid discharge port 24. The gas introduction flow channels 12 extend downwardly from the gas communication flow channel 10 to be in communication respectively and then collected integrally in the lower portion. The collected portion of the gas introduction flow channel 12 is in communication with a gas injection port 23.

The liquid discharge port 24 and the gas injection port 23 are perforated in upper and lower portions of the silicon substrate 52. The liquid discharge port 24 is in communication at one end with the pump 34 and at the other end with the liquid discharge flow channel 13. The gas injection port 23 is in communication at one end with the pump 33 and at the other end with the gas introduction flow channel 12. The pump 33 is adapted to increase a pressure to a predetermined level or control a flow rate to a predetermined rate by the control device.

Then, the operation of the reaction apparatus 60 is to be described.

For conducting gas/liquid reaction by the reaction apparatus 60, the pumps 31 to 34 are operated by the operation of the control device. Then, a liquid to be used for gas/liquid reaction is introduced from the outside of the apparatus by way of the pipeline 42 and the liquid injection port 22 to the liquid introduction flow channel 14 and, further, supplied from the liquid introduction flow channel 14 being divided into plural liquid supply flow channels 1. Further, a gas used for the gas/liquid reaction is introduced from the outside of the apparatus by way of the pipeline 43 and the gas injection port 23 to the gas introduction flow channel 12 and further supplied from the gas introduction flow channels 12 divided in plurality through plural gas communication flow channels 10 to the gas supply flow channel 2.

Figure 4:
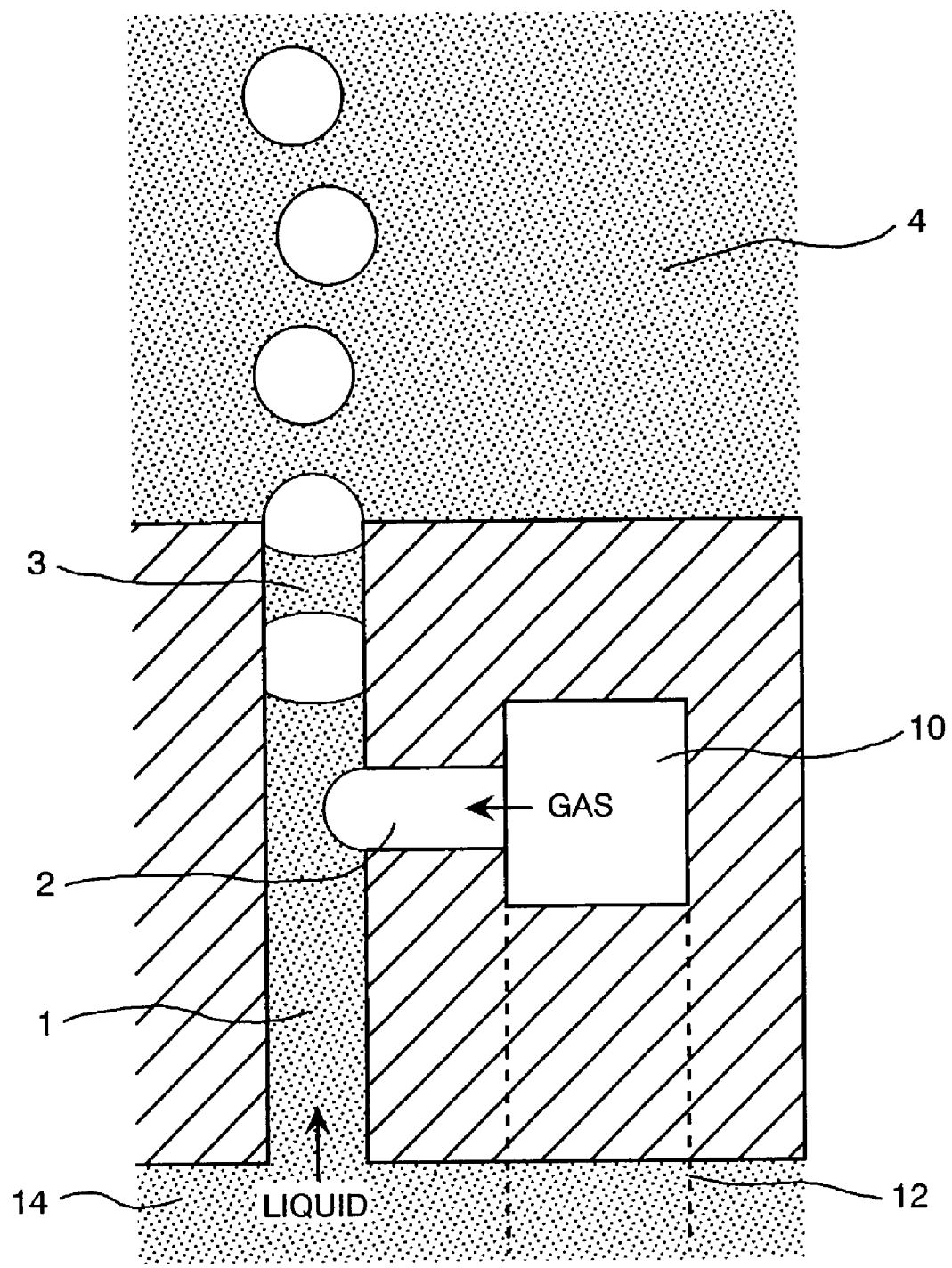
FIG. 4 is an enlarged view for a portion c in FIG. 1.

The liquid supplied to the liquid supply flow channel 1 and the gas supplied to the gas supply flow channel 2 are joined and flow as a two-phase stream as shown in FIG. 4 through the gas/liquid two-phase flow channel 3 and, further, reaches the bubble reaction flow channel 4. The two-phase stream of the gas/liquid two-phase flow channel 3 is in a state where a minute amount of liquid and a minute amount of gas are present alternately. The state of the two-phase stream can be formed with a constitution of a fine liquid supply channel, a fine gas supply channel 2 and a fine gas/liquid two-phase flow channel. The state of the two-phase stream can be generated more reliably by controlling the pump 32 and the pump 33 by the control device. That is, when the pressure of the liquid injected to the liquid supply flow channel 1 is increased, the volume of the gas flowing in the gas/liquid two-phase channel 3 is decreased, whereas when the pressure of the gas injected to the gas supply flow channel 2 is increased, the volume of the gas flowing in the gas/liquid two-phase flow channel 3 is increased, so that it is possible to control the volume of the gas and flowing the gas/liquid two-phase flow channel 3 and generate the two-phase stream by the control for both pressures. same effect can be obtained not only by the pressure control but also by the control for the flow rate. Further, the two-phase stream can also be generated by experimentally determining the cross sectional area for the flow channels 1 to 3 while keeping the operation of the pumps 32 and 33 constant.

When each of the gas and the liquid flows through the gas/liquid two-phase flow channel 3, reaction between the gas and the liquid is started. That is, a portion of the gas (gas at the boundary with the liquid) reacts with the liquid at the periphery thereof. Then, since the two-phase stream generating portion comprising the liquid supply flow channel 1, the gas supply flow channel 2 and the gas/liquid two-phase flow channel 3 is formed of fine flow channels, gas in the two-phase stream is formed at an extremely small size. Accordingly, the gas/liquid reaction rate is increased in the gas/liquid two-phase flow channel 3 and the bubble reaction flow channel 4. Since the fine liquid supply flow channel 1, the gas supply flow channel 2 and the gas/liquid two-phase flow channel 3 are formed uniformly by using the micro-machining technique, the gas/liquid supply, gas/liquid reaction and formation of the two-phase stream are conducted stably.

Particularly, since the shape of the gas supply flow channel 2 opened to the liquid supply flow channel 1 is such that the length in the liquid flowing direction is substantially longer than the length in the direction crossing therewith, the gas flowing from the gas supply flow channel 2 to the liquid supply flow channel 1 can be reduced. That is, since the surface tension of bubbles remaining at the exit of the flow channel 2 is lowered, the volume of the gas flowing into the joined portion can be set smaller. Also with this view point, the gas/liquid reaction rate can be increased in the gas/liquid two-phase channel 3 and the bubble reaction flow channel 4.

Further, since the cross sectional area for the flow channel is smaller in the gas supply flow channel 2 than in the liquid supply flow channel 1, gas flowing from the gas supply flow channel 2 to the liquid supply channel 1 can be reduced. Also with this view point, the gas/liquid reaction rate can be increased in the gas/liquid two-phase flow channel 3 and the bubble reaction flow channel 4.

The gas flowing from the gas/liquid two-phase channel 3 to the bubble reaction flow channel 4 is driven as fine bubbles into the liquid of the bubble reaction flow channel 4. Since the fine bubbles are driven out in the state of the two-phase stream where the liquid and the gas are alternately from the gas/liquid two-phase flow channel 3 as the fine flow channel, the gas in the two-phase stream is driven out successively as extremely fine uniform bubbles. In a case where the volume of the gas in the two-phase stream is set particularly smaller, the gas driven out of the gas/liquid two-phase flow channel 3 can be driven easily and finer bubbles are driven into the bubble reaction flow channel 4. The fine bubbles ascend in the liquid of the bubble reaction flow channel 4 and react with the liquid during stagnation in the liquid of the bubble reaction flow channel 4.

Since the bubbles driven out of the gas/liquid two-phase flow channel 3 are uniform and fine, reaction with the liquid in the bubble reaction flow channel 4 is taken place stably and rapidly. That is, in a case of a large bubble, since the bubble ascends directly in the bubble reaction flow channel 4 to shorten the contact time with the liquid and the specific surface area in contact therewith is reduced, the gas/liquid reaction rate per volume of the bubble is decreased. On the contrary, in a case of a small bubble, since the bubble ascends slowly in the bubble reaction flow channel 4 to increase the time of contact with the liquid and the specific surface area is increased, the gas/liquid reaction rate per volume of the bubble is increased. Then, even when the time of contact between the bubble and the liquid is longer, since the size of the bubbles is made uniform, stable gas/liquid reaction ratio can be obtained. Accordingly, when the liquid subjected to gas/liquid reaction is analyzed, the accuracy for the analysis is improved outstandingly.

Then, since a plurality of two-phase stream generation portions are disposed to the bubble reaction flow channel 4, the number of bubbles formed per unit volume in the bubble reaction flow channel 4 is increased. This increases the amount of gas/liquid reaction in the bubble reaction flow channel 4 to improve the gas/liquid reaction efficiency in the reaction apparatus 60. Further, the amount of gas/liquid reaction in the gas/liquid two-phase flow channel 3 of the two-phase stream generation portion is also increased, and the gas/liquid reaction efficiency of the reaction apparatus 60 is also improved with this view point.

Further, since the fine liquid supply flow channel 1, the gas supply flow channel 2 and the gas/liquid two-phase channel 3 are formed uniformly by using the micro-machining technique, it is possible for stable gas/liquid supply, gas/liquid reaction and formation of two-phase stream.

Further, bubbles of a diameter of 100 µm or less can be formed by decreasing the cross sectional area for the flow channels 1 to 3 to $1 \times 10^{-8}$ m$^2$ or less. Further, when it is decreased to $0.25 \times 10^{-8}$ m$^2$ or less, the diameter of the bubble can be decreased to one-half or less. By setting the flow channel cross sectional area as described above, the gas/liquid reaction rate in the gas/liquid two-phase flow channel 3 and the bubble reaction flow channel 4 can be increased outstandingly. The lower limit value of the flow channel cross sectional area is a value that the flow channel can be manufactured.

The fine bubbles ascend as far as the boundary between the liquid and the gas reservoir and are separated together with the gas reservoir from the liquid. Further, since the gas in the gas reservoir is also in contact with the liquid, reaction is taken place between both of them. However, since the specific surface area at the boundary is smaller compared with that of the fine bubbles, the reaction ratio is smaller.

The gas separated from the liquid is introduced by the suction of the pump 31 through the gas discharge flow channel 6 downwardly and, further, discharged passing through the gas discharge port 21 and the pipeline 41 to the outside of the apparatus. On the other hand, the liquid in the upper portion of the bubble reaction flow channel 4 that has reacted with the gas is introduced by the suction of the pump 34 through the liquid communication flow channel 5 and the liquid discharge flow channel 13 downwardly and, further, discharged to the outside of the apparatus passing through the liquid discharge port 24 and the pipeline 44.

Since the bubble reaction flow channel 4 is formed longitudinally, the lower end of the fluid communication flow channel 5 is situated below the lower end of the gas discharge flow channel 6, and the vertical size of the fluid communication flow channel 5 is set larger than the vertical size of the gas discharge flow channel 6, the separated gas and liquid are discharged reliably. That is, even when the supply amount and the reaction amount of the liquid and the gas should vary, such variation can be absorbed reliably with the constitution described above.

In a case where the gas and the liquid are automatically separated and taken out by the supply function of the pump 32 and the pump 33, it is not necessary to provide the pump 33 and pump 34.

The discharge gas and the liquid are introduced, for example, to an analysis apparatus and subjected to predetermined analysis. That is, the reaction apparatus 60 is used, for example, in a case of analyzing an ingredient content in the gas by dissolving the same into a specific liquid, or in a case of analyzing an ingredient content in the liquid by dispersing into a predetermined gas, the two method of use is particularly useful in a case where the reagent used is expensive, or the amount of the material to be inspected is in a trace amount. Further, the reaction apparatus 60 is applicable, for example, to a case of producing chemicals formed by reacting a liquid and a gas, as well as to a case where ingredients present in a gas are changed by utilizing enzymes contained in the liquid.

While the apparatus main body 50 is used as a vertical type in this embodiment, it may also be used as a horizontal type. The horizontal type apparatus main body 50 is effective in a case where the installation height is restricted. In a case of use as the horizontal type, it is necessary that the flow channel for supplying the gas and the flow channel for discharging the gas are disposed above the liquid flow channel.

Further, while the flow channel of the apparatus main body 50 is fabricated by using the micro-machining technique, it can also be fabricated by using a semiconductor manufacturing technique. Formation of the flow channel by using the semiconductor manufacturing technique can facilitate mass production at a reduced cost. Further, the apparatus main body 50 may also be manufactured by using a resin material transferred with flow channels and the like on a silicon substrate manufactured by using the micro-machining technique.

Further, in this embodiment, flow channels of the apparatus main body 50 are formed on the silicon substrate 52 but the flow channels may be formed on the glass substrate 51 and the glass substrate 53 and, further, the flow channels may be formed divisionally in the glass substrate 51, the silicon substrate 52 and the glass substrate 53.

Figure 5:
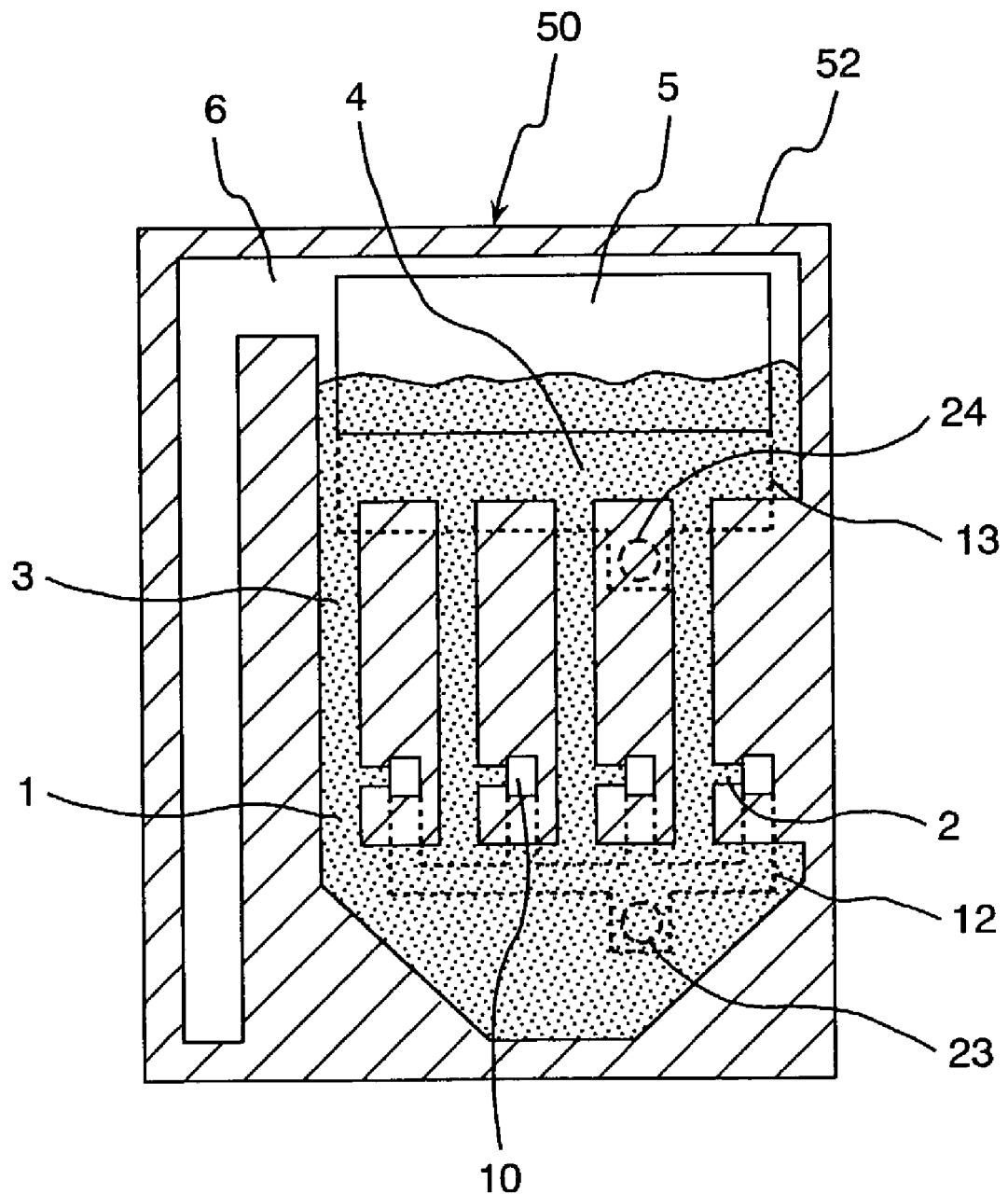
FIG. 5 is a constitutional view showing a reaction apparatus of a second embodiment according to this invention with a glass substrate being omitted.

Then, the reaction apparatus of a second embodiment according to this invention is to be described with reference to FIG. 5. The second embodiment is different from the first embodiment as will be described below but basically identical with the first embodiment for other portions.

In this second embodiment, the flow channel length of the gas/liquid two-phase flow channel 3 is formed longer than the flow channel length of the bubble reaction flow channel 4. In general gas/liquid reaction, the efficiency is improved by making the length of the gas/liquid two-phase flow channel 3 shorter and making the bubble reaction flow channel 4 longer as shown in the first embodiment. However, depending on the physical properties such as viscosity of the liquid, the reaction conducted in the gas/liquid two-phase flow channel 3 sometimes shows higher efficiency. This second embodiment is effective to such a case.

Figure 6:
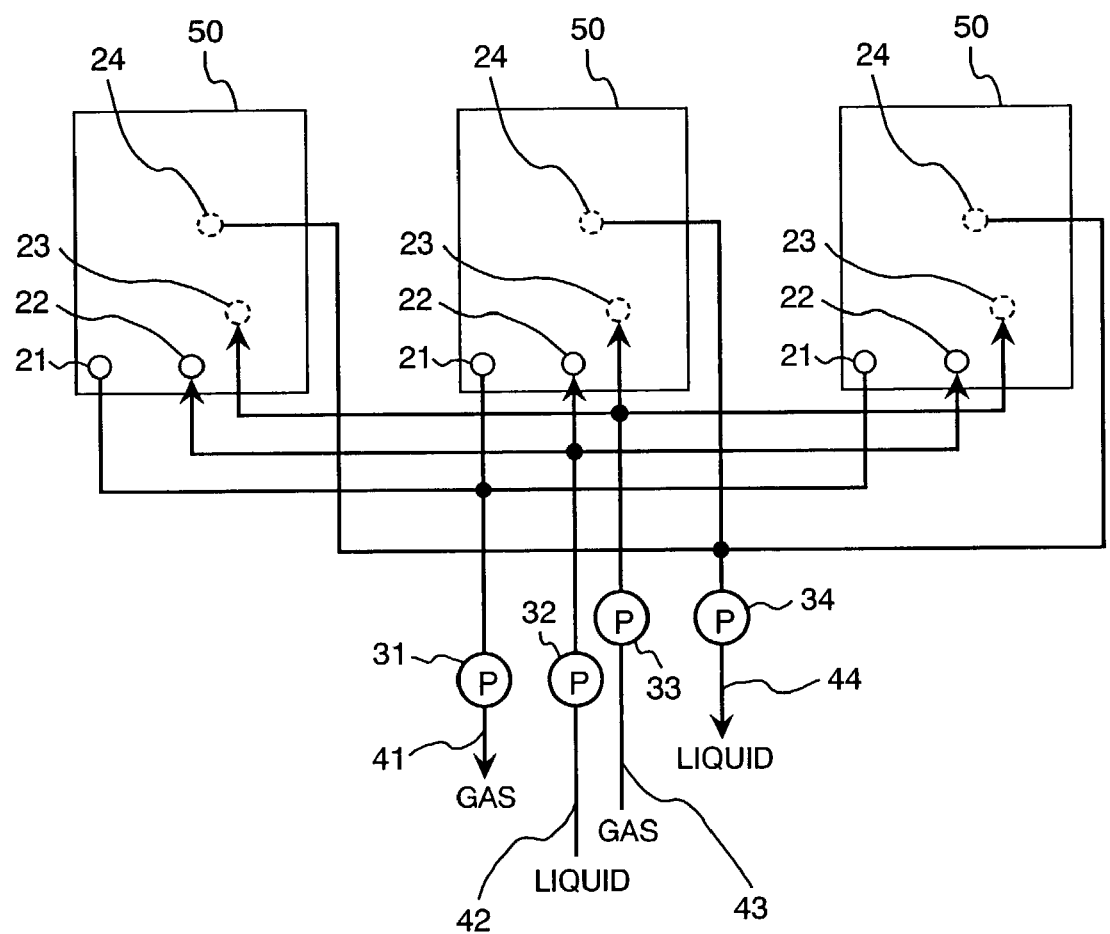
FIG. 6 is a constitutional view showing a reaction apparatus of a third embodiment according to this invention.

Then, the reaction apparatus of a third embodiment according to this invention is to be described with reference to FIG. 6. The third embodiment is different from the first embodiment as will be described below but basically identical with the first embodiment for other points.

In the third embodiment, apparatus main bodies 50 are connected by plurality in parallel. Specifically, pumps 31 to 34 are in common with each of the apparatus main bodies 50 and pipelines 41 to 44 for each of the pumps 31 to 34 on the side of the apparatus main body 50 are branched and connected with the apparatus main body 50. Since the apparatus main body 50 are connected in parallel, the processing amount can be increased by plural times. Accordingly, a reaction apparatus 60 of different processing amount can be obtained easily by using identical apparatus main bodies 50. In a case where the processing amount in each of the apparatus main bodies 50 is varied to lower the generation efficiency of the bubbles, it is desirable to control the processing amount of each apparatus main body 50 and improve the generation efficiency of the bubbles by disposing a flow control valve to each of the pipelines 42 between the pump 32 and the each of the injection portions 22, and disposing a flow control valve to each pipeline 43 between the pump 33 and each of the injection ports 23.

Figure 7:
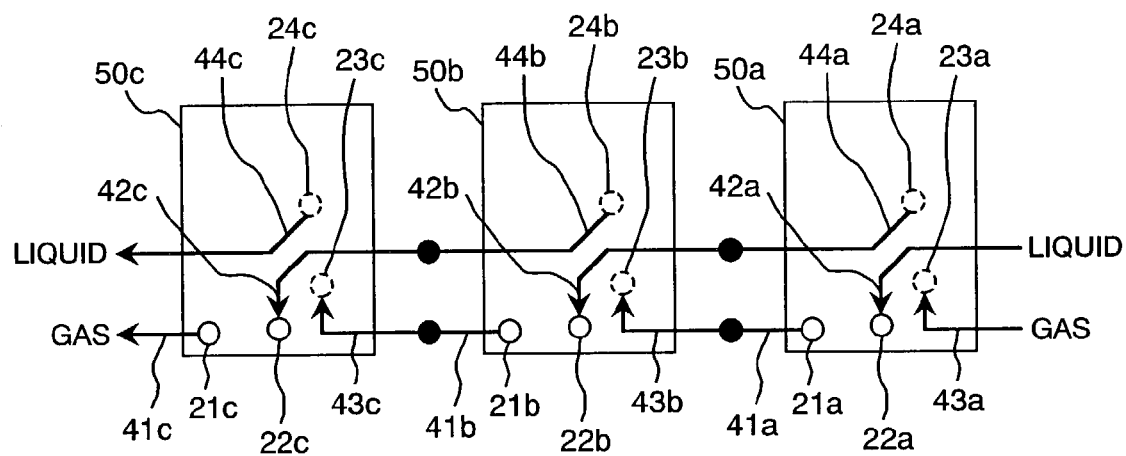
FIG. 7 is a constitutional view showing a reaction apparatus of a fourth embodiment according to this invention.

Then, the reaction apparatus of a fourth embodiment according to this invention is to be described with reference to FIG. 7. The fourth embodiment is different from the first embodiment as described below but basically identical with the first embodiment for other points.

In the fourth embodiment, a plurality of apparatus main bodies 50a, 50b and 50c are connected in series. Specifically, pipelines 42a, 43a are connected with a first apparatus main body 50a, a pipeline 44a of the apparatus main body 50a is connected with a pipeline 42b of a second apparatus main body 50b, and a pipeline 41a of the apparatus main body 50a is connected with a pipeline 43b. Thus, a liquid and a gas subjected to gas/liquid reaction in the first apparatus main body 50a are supplied to the second apparatus main body 50b. Further, a pipeline 44b of the apparatus main body 50b is connected with a pipeline 42c of a third apparatus main body 50c and a pipeline 41b of the apparatus main body 50b is connected with a pipeline 43c of the apparatus main body 50c. Thus, the liquid and the gas subjected to gas/liquid reaction in the second apparatus main body 50b are supplied to the third apparatus main body 50c. Then, liquid and the gas subjected to gas/liquid reaction in the third apparatus main body 50c are taken out of the pipeline 44c and the pipeline 41c.

Since the apparatus main bodies 50 are connected in series, the gas/liquid reaction time is outstandingly increased to improve the gas/liquid reaction rate outstandingly high. Accordingly, a reaction apparatus 60 of different gas/liquid reaction rate can be obtained easily by using plurality of identical apparatus main bodies 50a to 50c.

Figure 8:
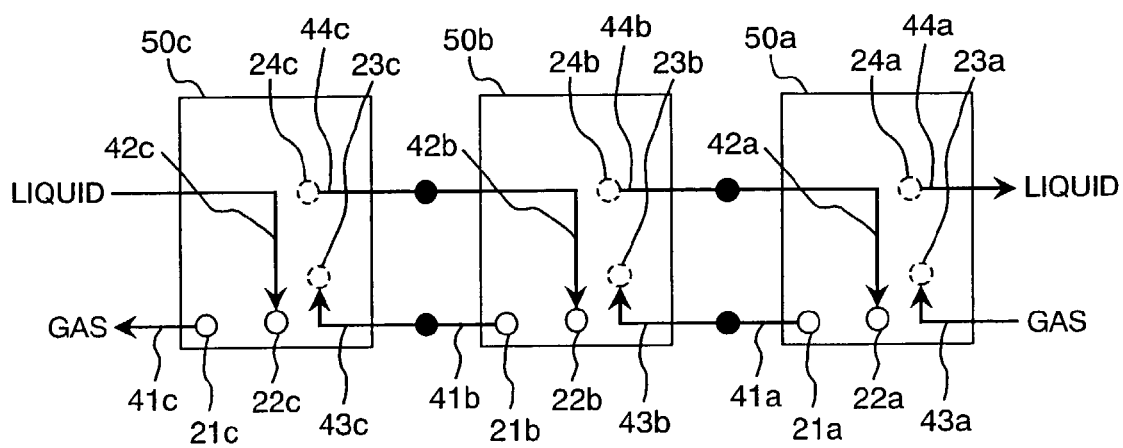
FIG. 8 is a constitutional view showing a reaction apparatus of a fifth embodiment according to this invention.

Then, the reaction apparatus of a fifth embodiment according to this invention is to be described with reference to FIG. 8. The fifth embodiment is different from the fourth embodiment as described below but basically identical with the fourth embodiment for other points.

In the fifth embodiment, while plural apparatus main bodies 50a, 50b and 50c are connected in series, the flowing direction of the liquid is opposite to that in the fourth embodiment. Also in the fifth embodiment, a high gas/liquid reaction rate can be obtained in the same manner as in the fourth embodiment. By using fourth and fifth embodiments selectively, restriction for the arrangement of the pipelines for liquid and gas can be improved.

Then, a mixing system as a sixth embodiment according to this invention is to be described with reference to FIG. 9 to FIG. 13.

Figure 9:
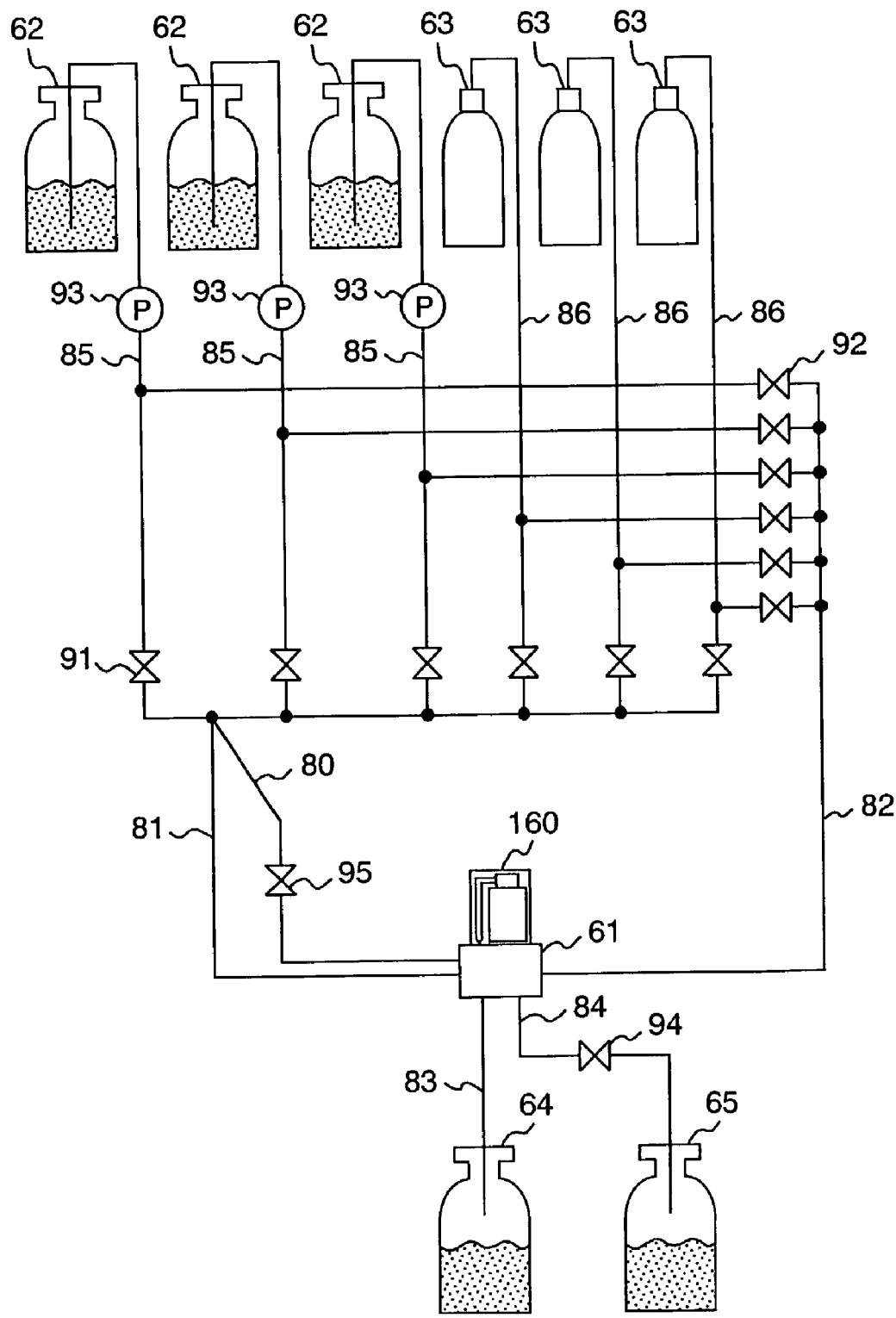
FIG. 9 is a constitutional view showing a mixing system of a sixth embodiment according to this invention.
Figure 10:
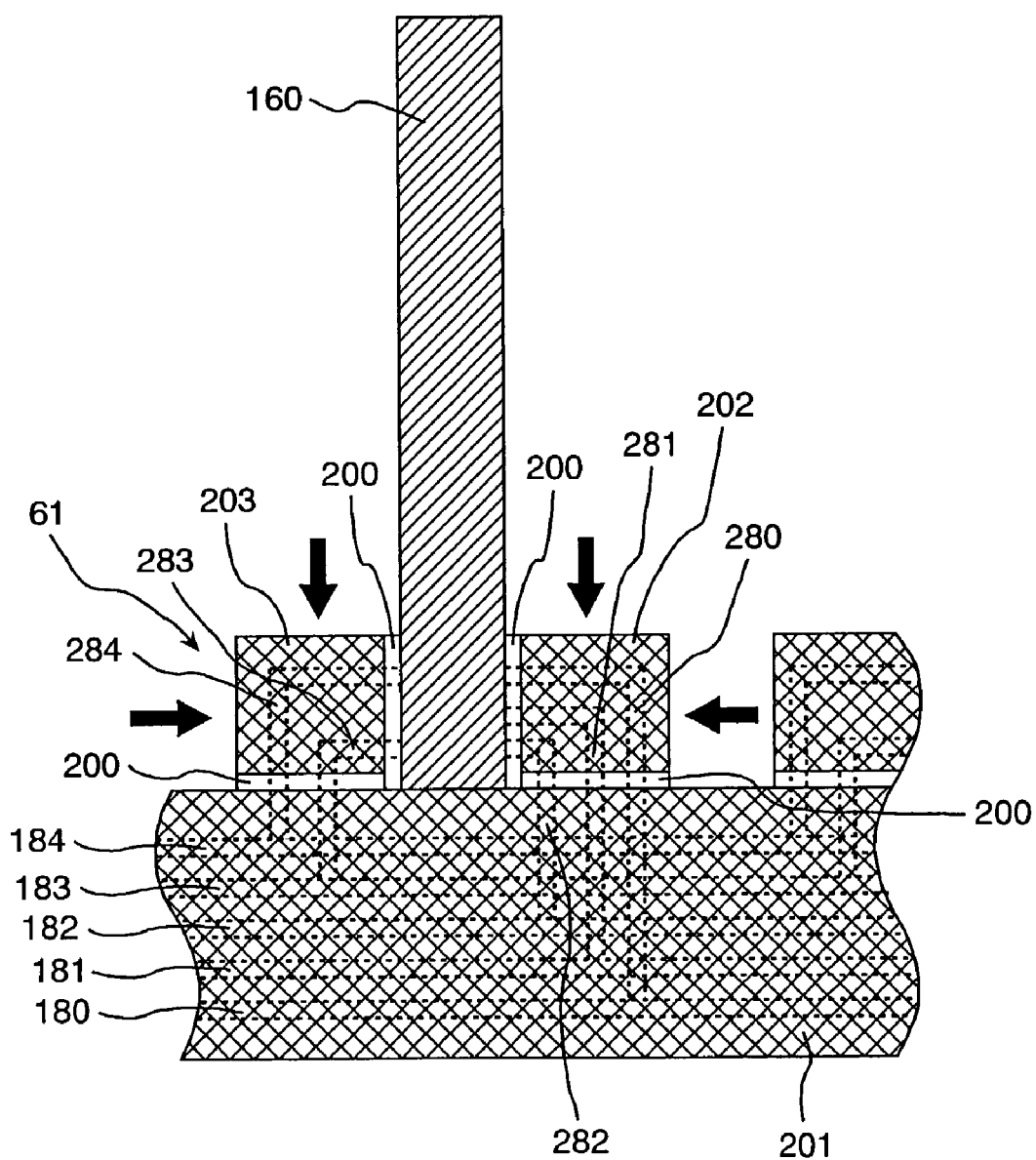
FIG. 10 is an enlarged cross sectional view for a holder portion used in the mixing system shown in FIG. 9.

At first, the entire constitution and the operation of the mixing system is to be described with reference to FIG. 9 and FIG. 10. A mixing apparatus 160 is attached detachably to an exclusive holder 61. At least one of the mixing apparatus 160 and the holder 61 has a resilient portion so as to be attached with each other detachably, by which the attached state can be kept reliably and they can be attached or detached easily. Thus, when a trouble is caused to the mixing apparatus 160, it may be replaced simply with a spare component. Further, two or more kinds of mixing apparatus having different structures (not illustrate) are provided and a micro-mixing apparatus is replaced manually or automatically as required for obtaining aimed products.

The holder 61 is connected with a plurality of pipelines 80 to 84 and the plurality of pipelines 80 to 84 comprise inlet pipelines 80 to 82 and exit pipelines 83 and 84. The inlet pipeline 80 is connected at one end to a liquid injection port 125 to be described later while the inlet pipeline 81 is in communication at one end with a liquid injection port 122 to be described later, the inlet pipeline 82 is in communication at one end with a fluid injection port 123 to be described later, the exit pipeline 83 is in communication at one end with a liquid discharge port 124 to be described later, and the exit pipeline 84 is in communication at one end with a fluid discharge port 121 to described later.

Connection between the mixing apparatus 160 and the exclusive holder 161 is to be described with reference to FIG. 10. The exclusive holder 161 is assembled with holder forming parts 201, 202, 203, and a resilient member 200. The mixing apparatus 160 is put between the holder forming parts 202 and 203 by way of resilient members 200. Further, the holder forming parts 202 and 203 are connected by way of the resilient member 200 with the holder forming part 201.

Flow channels 180, 181, 182, 183, 184 in the exclusive holder 161 are connected with the inlet pipelines 80, 81, 82 and the exit pipelines 83 and 84 and, further, they are branched into connection pipelines 280, 281, 282, 283 and 284 respectively in the exclusive holder.

Since the holder forming parts 201, 202 and 203 and the mixing apparatus 160 have a structure undergoing a force in the direction of arrows in the drawing and, accordingly, the resilient member 200 is deformed, the flow channel in the exclusive holder 161 has a sealed structure and the shield from the outside. Accordingly, fluids supplied from the inlet pipelines 80, 81 and 82 are supplied by way of the exclusive holder 161 to the mixing apparatus 160 and then discharged through the exit pipelines 83, 84.

The shape of the resilient member used herein may be a sheet-like or an O-ring shape.

The inlet pipeline 80 and the inlet pipeline 81 are connected at the other ends by way of flow control valves 91 to pipelines 85 and 86 connected to a plurality of vessels 62, 63 and the inlet pipeline 82 is connected at the other end with pipelines 85, 86 connected to the vessels 62, 63 by way of flow control valves 92. The inlet pipeline 80 is disposed in parallel with the inlet pipeline 81 with a flow control valve 95 being disposed at an intermediate portion. The flow control valves 91, 92 and 95 are on/off controlled and controlled for the amount of opening by a control device (not illustrated). The pipeline 81, the pipeline 85, the flow control valve 91 and the pump 93 constitute a first pressurization device to a two-phase stream generation portion and the pipeline 82, pipeline 85, the flow control valve 92 and the gas reservoir 63 constitute a second pressurization device to the two-phase stream generation portion.

A plurality of vessels 62, 63 containing fluids comprise vessels 62 containing liquids to be used for mixing and vessels 63 containing gases to be used for mixing. The vessels 62 are provided by plurality and the pipeline 85 is connected with each of them. Each of the pipelines 85 has a flow control valve 91 and is concentrically connected to the pipeline 81 (and pipeline 80) and connected by way of a flow control valve 92 concentrically to the pipeline 82. Pumps 93 for supplying liquids in the vessels 62 are disposed between the flow control valves 91, 92 and the vessels 62 (i.e., on the exit of the vessels 62). the vessels 63 are provided in plurality and connected with pipelines 86 respectively. The vessels 63 comprise gas reservoirs and the gas contained in the vessel 63 is released by the pressure of the sealed gas.

Further, the exit pipeline 83 is connected the other end with a vessel 64 and the exit pipeline 84 is connected at the other end by way of a flow control valve 94 with a vessel 65. The flow control valve 94 is on-off controlled by a control device.

When the control device is operated to open the selected flow control valve 91, the liquid or gas in the vessel 62 corresponding to the flow control valve 91 flows through the pipeline 81 to the holder 61 (also through the pipeline 80 to the holder 61 when the flow control valve 95 is open), and is further supplied to the mixing apparatus 160. Further, when the control device is operated to open the selected flow control valve 92, the liquid or the gas (referred to as a fluid when both of them are referred to collectively) of the vessels 62, 63 corresponding to the flow control valve 92 is supplied through the pipeline 82 to the holder 61 and further supplied to the mixing apparatus 160. When the liquid is supplied from the vessel 62, it is necessary that the corresponding pump 93 is operated at the same time. In this way, mixing between the liquid and the gas or between a liquid and another liquid is started in the mixing apparatus 60.

In a case where the aimed product obtained by mixing comprises one kind, the flow control valve 94 is closed and all the products are recovered through the pipeline 83 to the vessel 64 and provided as final products. Further, when the products obtained by mixing comprises two kinds of materials, the flow control valve 94 is opened, by which they are flowed out separately into the pipeline 83 and the pipeline 84 and required materials are recovered to obtain aimed products.

Further, depending on the type of the liquid or gas to be mixed, the flow control valve 95 is opened to supply a liquid from the liquid injection port 125 into a mixing flow channel 104 to cause flowing of the liquid to the exit of a communication flow channel 115. That is, in a case where the fluid of the two-phase stream driven out from the communication flow channel 115 into a mixing flow channel 104 is a material that liquid bubbles or gas bubbles stagnate in the mixing flow channel 104, liquid bubbles or gas bubbles can be prevented from directly combined in the mixing flow channel 104, by supplying the liquid from the liquid injection port 125.

Figure 11:
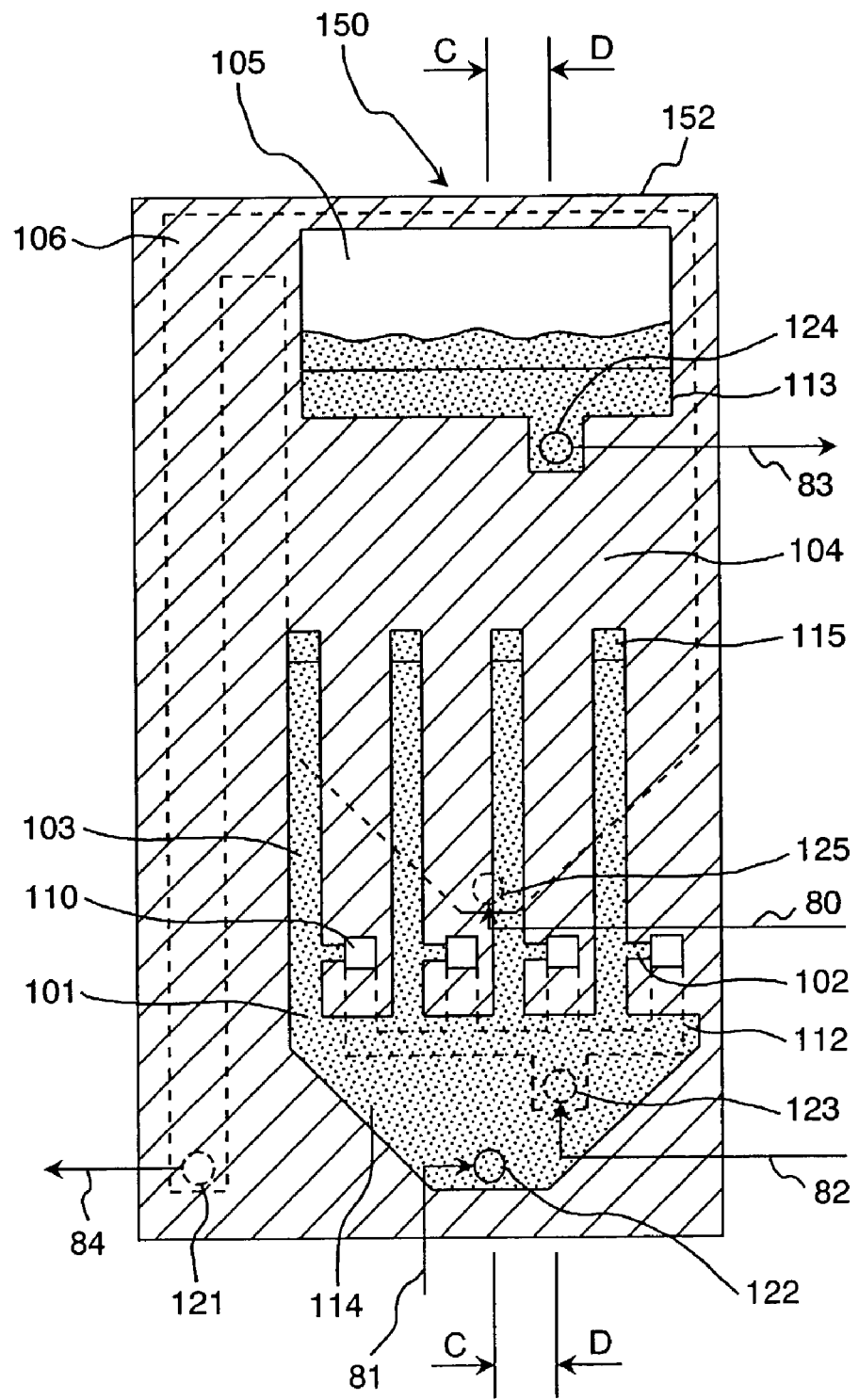
FIG. 11 is a front elevational constitutional view for a mixing apparatus used in the mixing system shown in FIG. 9.
Figure 12:
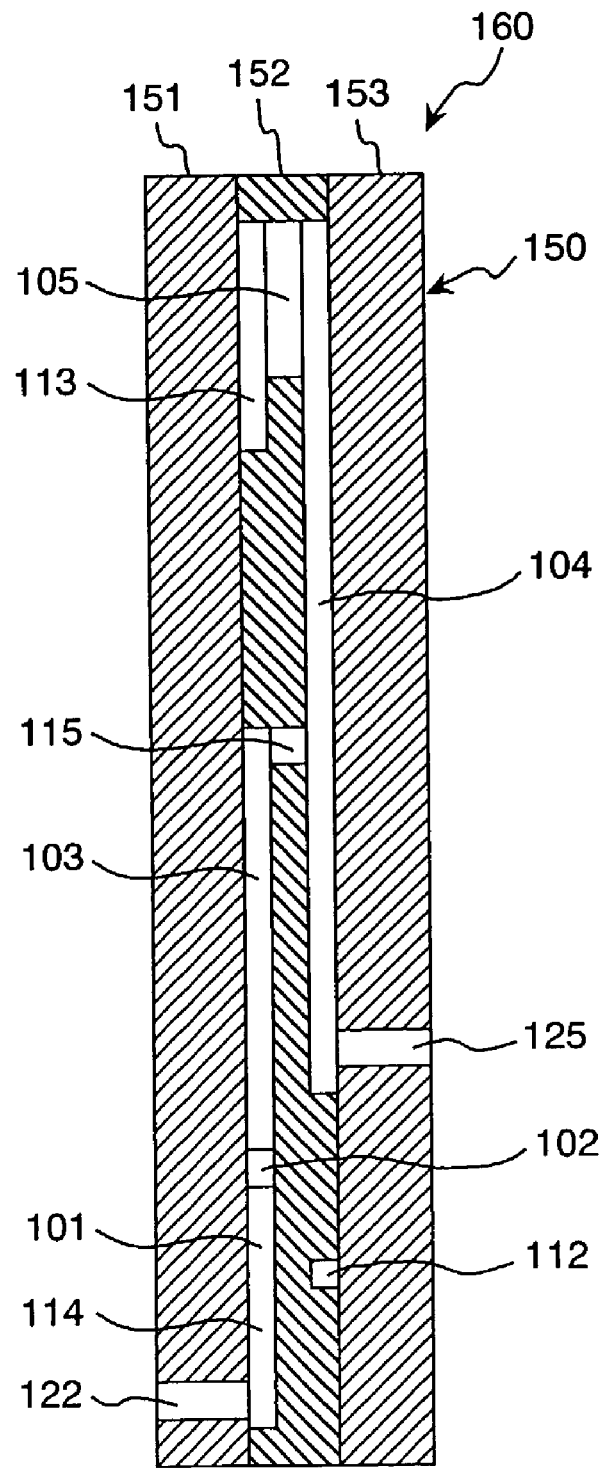
FIG. 12 is a cross sectional view taken along line C-C in FIG. 11.
Figure 13:
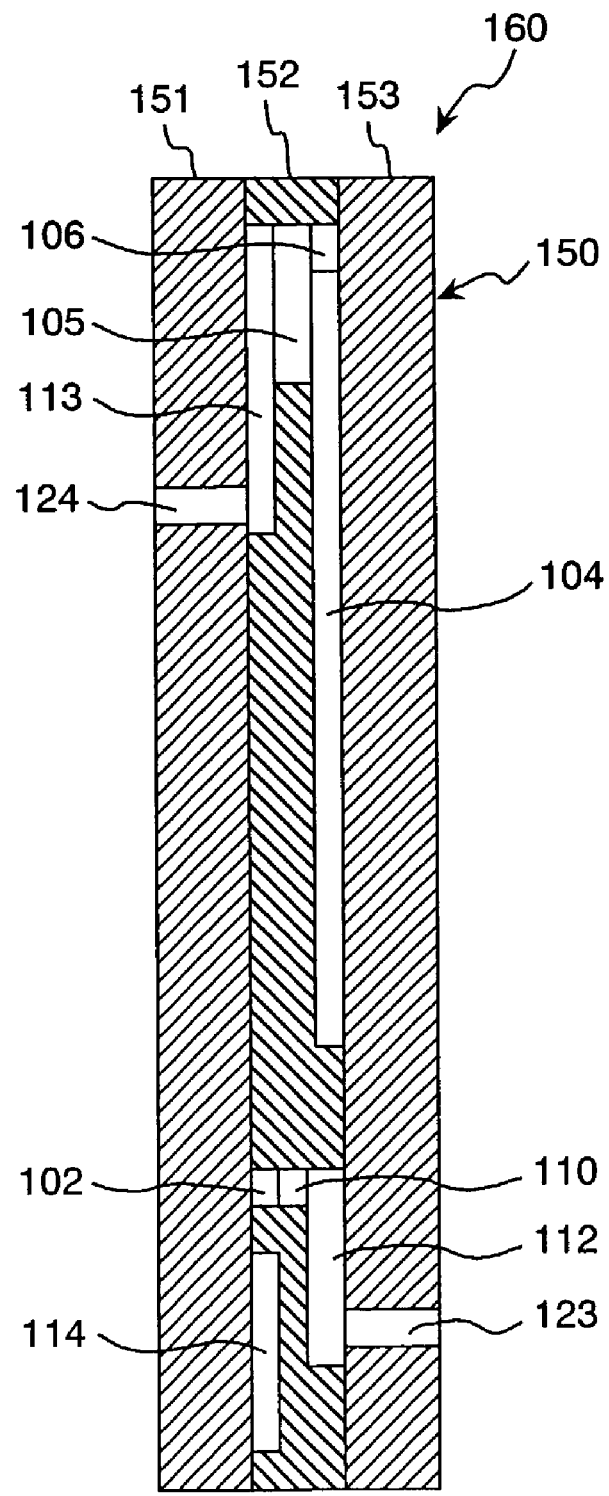
FIG. 13 is a cross sectional view taken along line D-D in FIG. 11.

Concrete constitution and operation of the mixing apparatus 160 are to be described with reference to FIG. 11 to FIG. 13.

The mixing apparatus 160 has a apparatus main body 150 constituting a main portion. The apparatus main body 150 is formed of a multi-layered structure in which a plurality of substrates are stacked and joined. Specifically, the device main body 150 has a three-layered structure comprising a glass substrate 151, a silicon substrate 152 and a glass substrate 153. Flow channels, flow ports and the like of the glass substrate 151, the silicon substrate 152 and the glass substrate 153 are formed each into a predetermined shape by using the micro-machining technique. The apparatus main body 150 is constituted with a micro-capsule of a thin cuboidal body having an outer profile size of about 15 mm width×20 mm height×1.5 mm depth.

A fluid discharge port 121 is perforated in a lower portion of the glass substrate 151. The fluid discharge port 121 is in communication at one end with a pipeline 84 and at the other end with a fluid discharge channel 106. A liquid injection port 122 is formed in a lower portion of the glass substrate 153. The first liquid injection port 122 is in communication at one end with the pipeline 81 and at the other end with a liquid introduction flow channel 114. The pump 93 described above is adapted to increase a pressure to a predetermined level or control a flow rate to a predetermined rate by the control device. Further, a second liquid injection port 125 is perforated in a central portion of the glass substrate 153. The liquid injection port 125 is in communication at one end with the pipeline 80 and at the other end with a lower portion of the mixing flow channel 104, specifically, below a communication flow channel 115 between the two-phase flow channel 103 and the mixing flow channel 104.

In the silicon substrate 152, are formed flow channels from both front and back sides by using a micro-machining technique. On one side (front side) of the silicon substrate 152, are arranged a liquid introduction flow channel 114, a liquid supply flow channel 101, a fluid supply flow channel 102, and a two-phase flow channel 103 from the lower portion upwardly, and a liquid discharge flow channel 113 is arranged in an upper portion independently. On the other side (back side) of the silicon substrate 152, a fluid introduction flow channel 112 and a mixing flow channel 104 are formed independently above and below. A fluid discharge flow channel 106 is formed on the side of the mixing flow channel 104. The liquid discharge flow channel 113 is in communication by way of a communication flow channel 105 with the mixing flow channel 104. The fluid introduction flow channel 112 is in communication by way of a communication flow channel 110 with the fluid supply flow channel 102. As described above, the communication flow channel 105 and the communication flow channel 110 function as holes for communicating the front and back flow channels.

The liquid introduction flow channel 114 is in communication at a lower portion with the first liquid injection port 122 and at an upper portion with the lower portion of the liquid supply flow channel 101. The liquid supply flow channels 101 are in communication in plurality with the liquid introduction flow channel 114. Each of the liquid supply flow channels 101 is in communication at the upper portion with the fluid supply flow channel 102. The two-phase flow channel 103 extends upwardly from the fluid joined portion as a communication portion between the liquid supply flow channel 101 and the fluid supply flow channel 102 to be in communication with a lower portion of the mixing flow channel 104. Accordingly, the two-phase stream generating portions each comprising the liquid supply flow channel 101, the fluid supply flow channel 102 and the two-phase flow channel 103 are disposed in parallel in plurality between the liquid introduction flow channel 114 and the mixing flow channel 104. The mixing flow channel 104 is formed longitudinally. The mixing flow channel 104 is in communication at an upper portion with the communication flow channel 105 and the fluid discharge flow channel 106. The lower end of the communication flow channel 105 is situated below the lower end of the fluid discharge flow channel 106, and the vertical size of the communication flow channel 105 is set larger than the vertical size of the fluid discharge flow channel 106. The fluid discharge flow channel 106 extends from upper to lower portions of the silicon substrate 152.

Each of the liquid supply flow channel 101, the fluid supply flow channel 102 and the two-phase flow channel 103 is formed of a fine flow channel with a flow channel cross sectional area of $1\times10^{-7}$ m$^2$ or less. The lower limit value for the flow channel cross sectional area is a value that the flow channel can be manufactured. In this embodiment, the liquid supply flow channel 101 and the two-phase flow channel 103 are of an identical flow channel cross sectional area and the fluid supply flow channel 102 has a smaller flow channel cross sectional area.

Further, the shape of the fluid supply flow channel 102 opened to the liquid supply flow channel 101 is made such that the length in the liquid flowing direction is larger than that in the direction crossing therewith. The shape of the opening is made as a rectangular shape which is easy to manufacture.

The liquid discharge flow channel 113 extends downwardly from the communication flow channel 105 to be in communication therewith as far as the central upper portion of the silicon substrate 152. The central upper portion of the liquid discharge flow channel 113 is in communication with the liquid discharge port 124. On the other hand, the fluid introduction flow channels 112 extend downwardly from the communication flow channel 110 respectively and are collected integrally in a lower portion. The collected portion for the fluid introduction flow channels 112 is in communication with the fluid injection port 123.

A liquid discharge port 124 is penetrated in a central upper portion of the silicon substrate 151. The liquid discharge port 124 is in communication at an end with the pipeline 83 and in communication at the other end with the liquid discharge flow channel 113. A fluid injection port 123 is penetrated in a lower portion of the silicon substrate 153. The fluid injection port 123 is in communication at one end with the pipeline 82 and at the other end with the fluid introduction flow channels 112.

The operation of the mixing apparatus 160 is to be described.

For mixing the liquid and the fluid by the mixing apparatus 160, the control device is operated to operate the pump 93 corresponding to the vessels 62, 63 containing a liquid or a gas as an object to be mixed and open the flow control valve 91 (including flow rate control). Thus, one of the liquids to be mixed is introduced from the vessel 62 by way of the pipeline 81 and the first liquid injection port 122 to the liquid introduction flow channel 114 and, further, from the liquid introduction flow channel 114 being divided to a plurality of liquid supply flow channels 101. Further, the other liquid or gas to be mixed is introduced from the vessel 63 or the vessel 62 by way of the pipeline 82 and the fluid injection port 123 and introduced being divided in plurality into the fluid introduction flow channels 112 and supplied, further, from the fluid introduction flow channels 112 through the communication flow channels 110 to the fluid supply flow channel 102.

One of the liquids supplied to the liquid supply flow channel 101 and the other liquid or gas supplied to the fluid supply flow channel 102 are joined and flow as a two-phase stream in the two-phase flow channel 103 and, further, reach the mixing flow channel 104. The two-phase stream in the two-phase flow channel 103 is in a state where one of the liquids in a minute amount and the other liquid or gas in a minute amount are present alternately. Such a state of the two-phase stream can be formed by the constitution comprising the fine liquid supply flow channel 101, the fine fluid supply flow channel 102 and the fine two-phase flow channel 103. Then, the state of such two-phase stream can be generated more reliably by controlling the pump 93 and the flow control valves 91, 92 by the control device. That is, when the injection pressure is increased or the injection flow rate is increased for one of the liquids, the volume of the other liquid or gas flowing in the two-phase flow channel 103 is decreased. On the other hand, when the injection pressure is increased or the injection flow rate is increased for the other liquid or gas, the volume of the other liquid or gas flowing in the two-phase flow channel 103 is increased, so that the volume of the other liquid or gas flowing in the two-phase flow channel 103 can be controlled and the two-phase stream can be generated by controlling them.

When the other liquid or the gas flows in the two-phase flow channel 103, mixing with one of the liquids is started. The mixing causes a case where the other liquid or gas is physically mixed with one of the liquids or a case where the other liquid or gas is reacted with one of the liquid and mixed therewith depending on the kind of both of the liquid and the gas to be mixed. In the latter case, a portion of the other liquid or gas is reacted with the other liquid at the periphery thereof and mixed.

Then, since the two-phase stream generation portion comprising the fluid supply flow channel 102 and the two-phase flow channel 103 is formed of fine flow channels, the other liquid or gas in the two-phase stream is generated in an extremely small size. This increases the mixing speed between the fluids in the two-phase flow channel 103 and the mixing flow channel 104. Further, since the fine liquid supply channel 101, the fluid flow channel 102 and the two-phase flow channel 103 are formed uniformly by using the micromachining technique, supply of the fluid, mixing of the fluids and formation of the two-phase stream can be conducted stably.

Particularly, since the shape of the fluid supply flow channel 102 opened to the liquid supply flow channel 101 is such that the length in the liquid flowing direction is substantially large than the length in the direction crossing, the other liquid or gas flowed out of the fluid supply channel 102 to the liquid supply flow channel 101 can be reduced. That is, since the surface tension of the other liquid or bubble stagnating at the exit of the flow channel 2 is lowered, the volume of the other liquid or gas flowing to the joined portion can be made smaller. Also with this view point, mixing speed between the fluids in the two-phase flow channel 103 and the mixing flow channel 104 can be increased.

Further, since the flow channel cross sectional area of the fluid supply flow channel 102 is smaller than that of the liquid supply flow channel 101, the other liquid or the gas joined from the fluid supply flow channel 102 to the liquid supply flow channel 101 can be reduced. Also with this view point, mixing speed between both of the fluids in the two-phase flow channel 103 and the mixing flow channel 104 can be increased.

The other liquid or the gas flowed out of the two-phase flow channel 103 by way of the communication flow channel 115 to the mixing flow channel 104 is driven as fine liquid bubbles or gas bubbles into the liquid of the mixing flow channel 104. Since the fine liquid bubbles or gas bubbles are driven in a state of the two-phase stream where it is alternated with one of the liquids from the two-phase flow channel 103 as the fine flow channel, they are driven successively in a uniform and extremely fine state. In a case where the volume of the other liquid or gas in the two-phase stream is set particularly small, the other liquid or the gas driven from the two-phase flow channel 103 can be driven easily and, further, fine liquid bubbles or gas bubbles are driven into the mixing flow channel 104. The fine liquid bubbles ascent in the liquid of the mixing flow channel 104 and are mixed with the liquid during stagnation in the liquid of the mixing flow channel 104.

Since the liquid bubbles or the gas bubbles driven out of the two-phase flow channel 103 are uniform and fine, mixing with the liquid in the mixing flow channel 104 is conducted stably and rapidly. That is, in a case of a large liquid bubble or gas bubble, the liquid bubble or gas bubble instantly ascends in the mixing flow channel 104 to shorten the time of contact with the liquid and decrease the specific surface area in contact therewith, the gas/liquid reaction rate per volume of the gas bubble is lowered. On the other hand, in a case of a small liquid bubble or gas bubble, the liquid bubble or gas bubble ascends slowly in the mixing flow channel 104 to increase the time of contact with the liquid and the specific surface area is increased, so that the mixing rate per volume of the liquid bubble or gas bubble is increased. Then, even when the time of contact between the liquid bubble or gas bubble and the liquid is increased, since the liquid bubble or gas bubble is made uniform, stable mixing ratio can be obtained. Accordingly, when the thus mixed liquid is analyzed, the accuracy for the analysis is improved outstandingly.

Then, after mixing the liquid and the liquid when they are taken out as a light liquid and a heavy liquid, the flow control valve 95 is opened to take out the light liquid from the fluid discharge port 121 and the heavy liquid from the liquid discharge flow channel 113. Further, in a case where the gas and the liquid are taken out after mixing the gas and the liquid, the flow control valve 95 is opened to take out the gas from the fluid discharge port 121 and take out the liquid from the liquid discharge flow channel 113. Further, when liquids are mixed and taken out as a kind of liquid, the flow control valve 95 is closed to take out the liquid only from the liquid discharge flow channel 113.

In a case where the other liquid or gas flowed out of the two-phase flow channel 103 to the mixing flow channel 104 is of such a kind as tending to stagnate when driven out as fine liquid bubbles or gas bubbles in the liquid of the mixing flow channel 104, the flow control valve 95 is also opened by the control device as described above, in which the same liquid as the liquid supplied to the liquid introduction flow channel 114 is supplied from the liquid injection port 125 to the mixing flow channel 104, and the liquid in the mixing flow channel 104 is passed from the liquid injection port 125 by way of the exit for the communication flow channel 115 to apply a flowing force to the liquid discharge port 124. This flows the liquid bubbles or gas bubbles driven to the mixing flow channel 104 with no stagnation to the liquid discharge port 124 to prevent them from directly coupling to each other.

Then, since a plurality of two-phase stream generation portions are disposed to the mixing flow channel 104, the number of bubbles formed per unit volume in the mixing flow channel 104 is increased. This increases the mixing amount in the mixing flow channel 104 to improve the mixing efficiency in the mixing apparatus 160. Further, the mixing amount in the two-phase flow channel 103 of the two-phase stream generation portion is also increased, and the mixing efficiency of the mixing apparatus 160 is also improved with this view point.

Further, since the fine liquid supply flow channel 101, the gas supply flow channel 102 and the two-phase channel 103 are formed uniformly by using the micro-machining technique, it is possible for stable gas or liquid supply, mixing for liquid and gas and liquid and liquid, and formation of two-phase stream.

Further, bubbles of a diameter of 100 μm or less can be formed by decreasing the cross sectional area for the flow channels 1 to 3 to $1 \times 10^{-8}$ m$^2$ or less. Further, when it is decreased to $0.25 \times 10^{-8}$ m$^2$ or less, the diameter of the liquid or gas bubbles can be decreased to one-half or less. By setting the flow channel cross sectional area as described above, the mixing speed in the two-phase flow channel 103 and the mixing flow channel 104 can be increased outstandingly. The lower limit value of the flow channel cross sectional area is a value that the flow channel can be manufactured.

The fine liquid or gas bubbles ascend as far as the boundary between the liquid and the fluid reservoir, join with the fluid or gas in the fluid reservoir and are separated from the liquid in the lower portion of the fluid reservoir.

The liquid or the gas of the fluid reservoir is introduced downwardly through the fluid discharge flow channel 106 and, further past through the fluid discharge port 121 and the pipeline 84 and then taken out to the vessel 65. However, in a case where the liquid or the gas in the fluid reservoir is taken out, the flow control valve 94 is opened as described above.

On the other hand, the liquid mixed with the liquid bubbles or gas bubbles in the mixing flow channel 104 is introduced through the communication flow channel 105 and the liquid discharge flow channel 113 to the liquid discharge port 124 and then discharged through the pipeline 83 to the vessel 64.

Since the mixing flow channel 104 is formed longitudinally, the lower end of the communication flow channel 105 is situated below the lower end of the fluid discharge flow channel 106, and the vertical size of the communication flow channel 105 is set larger than the vertical size of the fluid discharge flow channel 106, the separated liquid or gas and liquid are discharged reliably. That is, even when the supply amount and the mixing amount of the liquid or gas and liquid should vary, variations can be absorbed reliably with the constitution described above.

The liquid discharged from the liquid discharge port 124 is introduced to the vessel 64, while the liquid or the gas discharged from the fluid discharge port 121 is introduced to the vessel 65, and they are used as a mixture for analysis, a mixture such as of chemicals, cosmetics and nutrients, as well as other mixtures. That is, the mixing apparatus 160 is used for analysis in a case of analyzing ingredients contained in a gas by dissolving them in a specified liquid or in a case of analyzing ingredients contained in a liquid by dispersing them into a specified gas. The two methods of use are particularly useful in a case where the reagent used is expensive, or the amount of the material to be inspected is small. Further, the mixing apparatus 160 is applicable, for example, to a case of producing chemicals formed by reacting a liquid and a gas, as well as to a case where ingredients present in a gas are changed by utilizing enzymes contained in the liquid. Further, the mixing apparatus 160 is used for producing cosmetics or nutrients by mixing liquids to each other or mixing a liquid and a gas.

While the apparatus main body 150 is used as a vertical type in this embodiment, it may also be used as a horizontal type. The horizontal type apparatus main body 50 is effective in a case where the installation height is restricted. In a case of use as the horizontal type, it is necessary that the flow channel for supplying the gas and the flow channel for discharging the gas are disposed above the liquid flow channel.

Further, while the flow channel of the apparatus main body 150 is fabricated by using the micro-machining technique, it can also be fabricated by using a semiconductor manufacturing technique. Formation of the flow channel by using the semiconductor manufacturing technique can facilitate mass production at a reduced cost. Further, the apparatus main body 150 may also be manufactured by using a resin material transferred with flow channels and the like on a silicon substrate manufactured by using the micro-machining technique.

Further, in this embodiment, flow channels of the apparatus main body 150 are formed on the silicon substrate 152 but the flow channels may be formed on the glass substrate 151 and the glass substrate 153 and, further, the flow channels may be formed divisionally in the glass substrate 151, the silicon substrate 152 and the glass substrate 153.

Further, while this embodiment has been described to an example of using only one mixing apparatus 160, a plurality of mixing apparatus 160 may be used for conducting the parallel processing in the same manner as in the third embodiment or serial processing in the same manner as in the fourth embodiment or fifth embodiment. Furthermore, the parallel processing and the serial processing may be combined in plurality to mix three kinds or more of materials successively.

Further, while three liquid vessels 62 and three gas reservoirs 63 are shown in this embodiment, there is no restriction for the number and the combination of them in this invention. The minimum required number for them is two, and the combination may comprise either one liquid vessel 62 and one gas reservoir 63, or two liquid vessels 62. Further, while five systems of pipelines are illustrated to be connected with the holder 61, the number not restrictive in this invention providing that the minimum required number comprises two systems for inlet pipelines and one system for exit pipeline, that is, three systems in total.

Further, the fluid flowing through the pipeline connected with the exclusive use holder 61 is not necessarily be one kind but plural flow control valve 91 or 92 may be opened and the fluids may be introduced to the mixing apparatus while controlling the flow rate for each of them to an optional value.

Then, a reaction apparatus of a seventh embodiment according to this invention is to be described with reference to FIG. 14 and FIG. 15.

Figure 14:
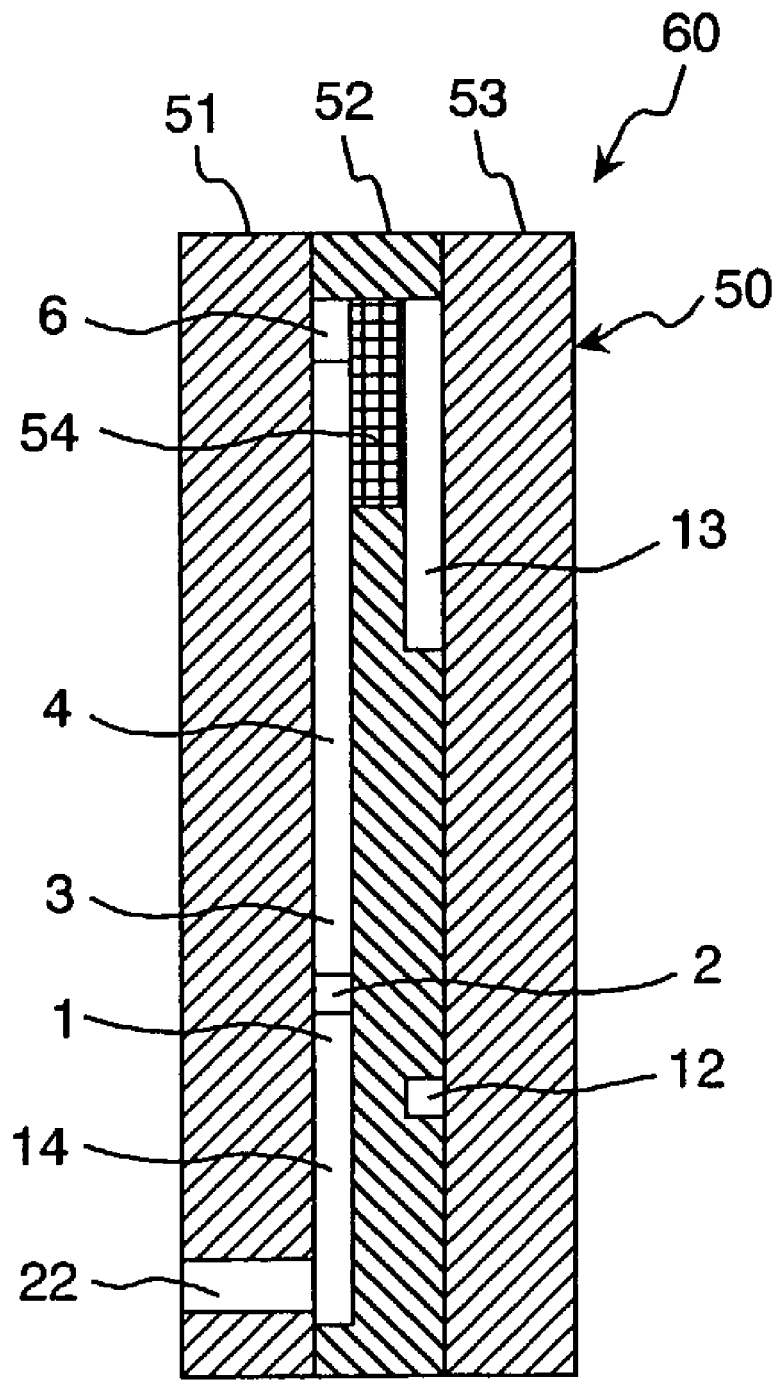
FIG. 14 is a cross sectional view showing a reaction apparatus main body of a seventh embodiment according to this invention taken along line A-A in FIG. 1.
Figure 15:
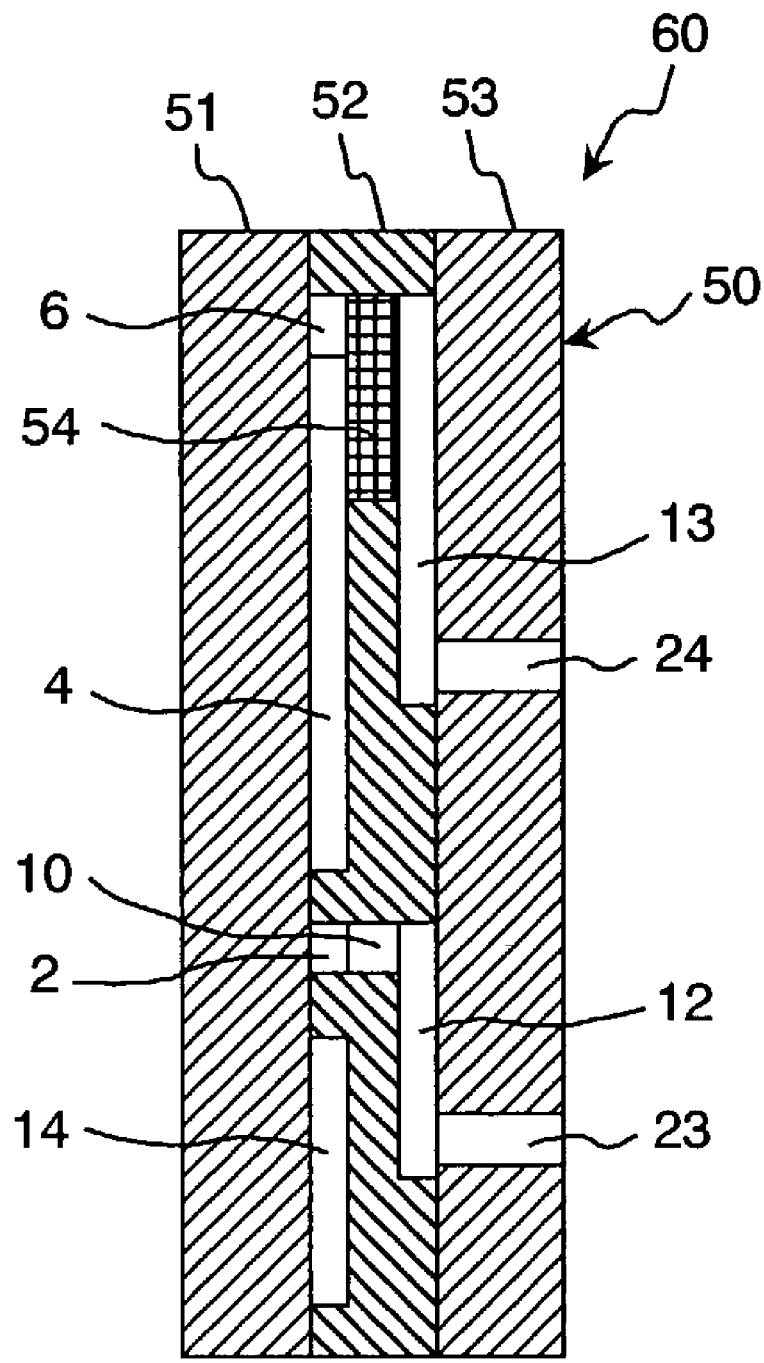
FIG. 15 is a cross sectional view showing a reaction apparatus main body of the seventh embodiment according to this invention taken along line B-B in FIG. 1.

FIG. 14 is a cross sectional view showing a reaction apparatus main body of the seventh embodiment according to this invention, corresponding to line A-A in FIG. 1. FIG. 15 is a cross sectional view showing a reaction apparatus main body of the seventh embodiment according to this invention corresponding to line B-B in FIG. 1.

The seventh embodiment is basically identical with the first embodiment but is different for the following points. In the seventh embodiment, the liquid discharge flow channel 13 and the liquid discharge port 24 in the first embodiment are a gas discharge flow channel 13 and a gas discharge port 24, while the gas discharge flow channel 6 in the first embodiment is a liquid discharge flow channel 6. Then, the liquid communication flow channel 5 disposed between the bubble reaction flow channel 4 and the gas discharge flow channel 13 is a gas communication channel 5. A gas/liquid separator 54 is disposed to the gas communication channel 5. As described above, the discharge systems for gas and liquid in the seventh embodiment are formed opposite to the first embodiment.

Since the gas/liquid separator 54 is formed of silicon and covered at the surface with a water repellent film, it allows a gas phase to permeate but inhibits permeation of a liquid. Accordingly, containment of liquid droplets in the gas phase portion can be suppressed effectively. The gas/liquid separator 54 uses, for example, a porous film formed with fine pores mainly of 20 μm or less in a case where the pressure difference before and after the gas/liquid separator 54 is 0.01 MPa and an angle of contact formed between a water repellent film and water used as a liquid is 100°. In a case where the differential pressure before and after the gas/liquid separator 54 is smaller, or the angle of contact formed between the liquid to be used and the water repellent film is larger, the diameter of the fine pores may be made larger. Further, the shape of the fine pores used herein is not necessarily be a circular cylindrical but it may be of a square cylindrical shape having a substantially identical cross sectional area.

The gas separated from the liquid after passing the gas/liquid separator 54 is introduced downwardly through the gas discharge flow channel 13 by the suction of the pump and, further discharged to the outside of the apparatus passing through the gas discharge port 24. On the other hand, the liquid in the upper portion of the gas bubble reaction flow channel reacted with the gas is introduced downwardly passing through the gas discharge flow channel 6 by the suction of the pump and is further discharged through the gas discharge port to the outside of the apparatus.

Further, as the gas/liquid separator 54, a micro-fine width slit may be used. The longer side in the cross section of the micro-fine width slit is disposed perpendicular to the advancing direction in the gas bubble reaction flow channel 4 and the length thereof is substantially identical with the flow channel width of the gas bubble reaction flow channel 4. The length for the shorter side of the micro-fine width slit is, preferably, 10 μm or less in a case where the differential pressure before and after the gas/liquid separator 54 is 0.01 MPa and the angle of contact formed between the water repellent film and water used as the liquid is 100°. In a case where the differential pressure before and after the gas/liquid separator 54 is smaller, or the angle of contact formed between the liquid used and the water repellent film is larger, the length for the shorter side of the micro-fine width slit may be larger. Further, in a case where the flow rate of the gas passing through the micro-fine width slit is large, the micro-fine width slits may be disposed in parallel to increase the processing amount per unit hour.

Further, the gas/liquid separating performance can also be improved by extending the water repellent film of the gas/liquid separator 54 as far as a portion of the gas bubble reaction flow channel 4 at the upstream, thereby lowering the frequency of contact between the liquid and the gas/liquid separator 54.

As apparent from the foregoing description, this invention can provide a reaction apparatus capable of obtaining a stable gas/liquid mixing ratio and increasing the reaction rate.

Further, this invention can provide a mixing system capable of easily replacing a mixing apparatus in a case where troubles should occur in the mixing apparatus or for obtaining necessary products, and capable of obtaining stable mixing ratio and increasing the mixing speed.

What is claimed is:

1. A reaction apparatus comprising:
   a first supply flow channel having a fine flow channel cross sectional area for supplying liquid pressurized by a first pressurizing device at a pressure or flow rate controlled by a control device;
   a second supply flow channel having a fine flow channel cross sectional area for supplying gas pressurized by a second pressurizing device at a pressure or flow rate controlled by the control device;
   a gas/liquid two-phase flow channel having a fine flow channel cross sectional area in communication with a joined portion for the first supply flow channel and the second supply flow channel for flowing the liquid from the first supply flow channel and the gas from the second supply flow channel as a gas/liquid two-phase fluid in a state in which a minute amount of liquid and a minute amount of gas are present alternately;
   a gas bubble reaction flow channel in communication with the exit of the two-phase channel and having a flow channel cross sectional area larger than that of the gas/liquid two-phase flow channel; and
   a liquid discharge flow channel for discharging the liquid in the gas bubble reaction flow channel after reaction.

2. A reaction apparatus comprising:
   a first supply flow channel having a fine flow channel cross sectional area for supplying a liquid pressurized by a first pressurizing device at a controlled pressure or flow rate controlled by a control device;
   a second supply flow channel having a fine flow channel cross sectional area for supplying a gas by a second pressurizing device at a pressure or flow rate controlled by the control device;
   a gas/liquid two-phase flow channel in communication with a joined portion for the first supply flow channel and the second supply flow channel and having a fine flow channel cross sectional area for flowing a gas/liquid two-phase fluid in a state in a state in which a minute amount of liquid and a minute amount of gas are present alternately;
   a gas bubble reaction flow channel in communication with the exit of the gas/liquid two-phase flow channel and having a flow channel cross sectional area larger than that of the gas/liquid two-phase flow channel;
   a liquid discharge flow channel for discharging the liquid of the gas bubble reaction flow channel; and a gas discharge flow channel for discharging the gas separated from the gas bubble reaction flow channel.

3. The reaction apparatus according to claim 1 or 2, wherein a micro fluid device is formed by stacking plural substrates and each of the flow channels is formed to the micro fluid device by using a micro-machining technique, a semiconductor manufacturing technique or the like.

4. The reaction apparatus according to claim 1 or 2, wherein the flow channel cross sectional area for each of the first supply flow channel, the second supply flow channel and the gas/liquid two-phase flow channel is $1 \times 10^{-7} m^2$ or less.

5. The reaction apparatus according to claim 1 or 2, wherein the flow channel cross sectional area of the second supply flow channel is made smaller than the flow channel cross sectional area of the first supply flow channel.

6. The reaction apparatus according to claim 1 or 2, wherein the length for the opening of the second supply flow channel joined to the first supply flow channel is made substantially larger in the liquid flowing direction than the length in the direction crossing therewith.

7. A reaction apparatus according to claim 1 or 2, wherein plural two-phase stream generation portions each comprising the first supply flow channel, the second supply flow channel and the gas/liquid two-phase flow channel are formed and the plural two-phase stream generation portions are connected in parallel with the gas/bubble reaction flow channel.

8. A reaction apparatus comprising:
an apparatus main body having a flow channel for reacting a liquid and a gas; and
a pump for supplying the liquid and the gas under pressure to the flow channel of the apparatus main body,
wherein the apparatus main body is formed of a multi-layered thin structure in which plural substrates are stacked and joined, and the flow channels are formed by using a micro-machining technique, a semiconductor manufacturing technique or the like, and the main body is arranged in a vertical state,
wherein the flow channel of the apparatus main body comprises a two-phase stream generation portion, a bubble reaction separation portion and a gas/liquid discharge portion,
wherein the two-phase stream generation portion comprises a first supply flow channel having a fine flow channel cross sectional area for supplying a liquid pressurized by a first pressurizing device at a pressure or flow rate of the liquid controlled by a control device, a second supply flow channel having a fine flow channel cross sectional area for supplying a gas pressurized by a second pressurizing device at a pressure or flow rate controlled by the control device, and a gas/liquid two-phase flow channel in communication with a joined portion for the first supply flow channel and the second supply flow channel and having a fine flow channel cross sectional area for flowing a gas/liquid two-phase fluid a in a state in which a minute amount of liquid and a minute amount of gas are present alternately,
wherein the gas bubble reaction and separation portion has a gas bubble reaction flow channel having a flow channel cross sectional area larger than that of the gas/liquid two-phase flow channel and in communication at a lower portion with the exit of the gas/liquid two-phase flow channel,
wherein the gas/liquid discharge portion has a liquid discharge flow channel for discharging the liquid in the upper portion of the gas bubble reaction flow channel, and wherein a gas discharge flow channel for discharging the gas in the upper portion separated from the gas bubble reaction flow channel.

9. The reaction apparatus according to claim 1 or 2, wherein the length of the gas liquid two-phase flow channel is made longer than the length of the gas bubble reaction flow channel.

10. A reaction apparatus comprising:
plural apparatus main bodies having flow channels for reacting a liquid and a gas; and
a device for supplying the liquid and the gas in the apparatus main bodies,
wherein the flow channel in each apparatus main body comprises:
a liquid supply flow channel having a fine flow channel cross sectional area for supplying a liquid pressurized by a first pressurizing device at a pressure or flow rate controlled by a control device;
a gas supply flow channel having a fine flow channel cross sectional area for supplying a gas pressurized by a second pressurizing device at a pressure or flow rate controlled by the control device;
a gas/liquid two-phase flow channel having a fine flow channel cross sectional area in communication with a joined portion for the liquid supply flow channel and the gas supply flow channel for flowing a gas/liquid two-phase fluid in a state in which a minute amount of liquid and a minute amount of gas are present alternately;
a gas bubble reaction flow channel in communication with the exit of the gas/liquid two-phase flow channel and having a flow channel cross sectional area larger than that of the gas/liquid two-phase flow channel;
a liquid discharge flow channel for discharging the liquid in the gas bubble reaction flow channel; and
a gas discharge flow channel for discharging a gas separated from the gas bubble reaction flow channel,
wherein the plural apparatus main bodies are connected in parallel by way of a liquid flow channel and a gas flow channel.

11. A reaction apparatus comprising:
plural apparatus main bodies having flow channels for reacting a liquid and a gas; and
a device for supplying the liquid and the gas in the apparatus main bodies,
wherein the flow channel in each apparatus main body comprises:
a liquid supply flow channel having a fine flow channel cross sectional area for supplying a liquid pressurized by a pressurizing device at a pressure or flow rate controlled by a control device;
a gas supply flow channel having a fine flow channel cross sectional area for supplying a gas pressurized by a second pressurizing device at a pressure or flow rate controlled by the control device;
a gas/liquid two-phase flow channel having a fine flow channel cross sectional area in communication with a joined portion for the liquid supply flow channel and the gas supply flow channel for flowing a gas/liquid two-phase fluid in a state in which a minute amount of liquid and a minute amount of gas are present alternately;
a gas bubble reaction flow channel in communication with the exit of the gas/liquid two-phase flow channel and having a flow channel cross sectional area larger than that of the gas/liquid two-phase flow channel;
a liquid discharge flow channel for discharging the liquid in the gas bubble reaction flow channel; and a gas discharge flow channel for discharging a gas separated from the gas bubble reaction flow channel, and wherein the plural apparatus main bodies are connected in series by way of a liquid flow channel and a gas flow channel.

12. A reaction method comprising the steps of:

supplying liquid through a first supply channel having a fine flow channel cross sectional area by a first pressurizing device;

controlling a pressure or flow rate of the liquid supplied through the first supply channel by a control device;

supplying gas through a second supply channel having a fine flow channel cross sectional area by a second pressurizing device;

controlling a pressure or flow rate of the gas supplied through the second supply channel by a control device;

flowing the liquid from the first supply flow channel and the gas from the second supply flow channel as a gas/liquid two-phase fluid in a state in which a minute amount of liquid and a minute amount of gas are present alternately to a gas/liquid two-phase flow channel having a fine flow channel cross sectional area;

flowing out the gas/liquid two-phase fluid to a gas bubble reaction flow channel having a larger flow channel cross sectional area than the gas/liquid two-phase flow channel and reacting the liquid and the object in the gas bubble reaction flow channel; and taking out the liquid of the reaction flow channel after reaction.

13. A reaction apparatus according to claim 1, wherein a gas/liquid separator is disposed between the gas bubble reaction flow channel and the liquid discharge flow channel.

14. The reaction apparatus according to any one of claims 1, 2, 10 and 11, wherein the fine flow channel cross sectional area is a cross sectional area provided by a micro-machining technique.

15. The reaction apparatus according to claim 1 or 2, wherein the flow channel cross sectional area for each of the first supply flow channel, the second supply flow channel and the gas/liquid two-phase flow channel is $1 \times 10^{-7}$ $m^2$ or less.

16. The reaction apparatus according to claim 10 or 11, wherein the flow channel cross sectional area for each of the liquid supply flow channel, the gas supply flow channel and the gas/liquid two-phase flow channel is $1 \times 10^{-7}$ $m^2$ or less.

17. The reaction method according to claim 12, wherein the flow channel cross sectional area for each of the first suppiy flow channel, the second supply flow channel and the gas/liquid two-phase flow channel is $1 \times 10^{-7}$ $m^2$ or less.

* * * * *